(12) United States Patent
Brown et al.

(10) Patent No.: US 10,544,851 B2
(45) Date of Patent: Jan. 28, 2020

(54) VEHICULAR VIBRATION ISOLATION SYSTEM AND APPARATUS

(71) Applicant: Ford Global Technologies, LLC, Dearborn, MI (US)

(72) Inventors: Todd Allen Brown, Franklin, MI (US); Russ Lee Norton, Brownstown Township, MI (US); Eric Hongtei Tseng, Canton, MI (US); Vladimir V. Kokotovic, Dearborn, MI (US); Davor Hrovat, Ann Arbor, MI (US); Donald Margolis, El Macero, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,771

(22) Filed: Feb. 23, 2017

(65) Prior Publication Data

US 2018/0238413 A1 Aug. 23, 2018

(51) Int. Cl.
*F16F 9/504* (2006.01)
*B60G 13/00* (2006.01)
*F16F 9/54* (2006.01)
*F16F 13/10* (2006.01)
*B60G 13/08* (2006.01)
(Continued)

(52) U.S. Cl.
CPC ............ *F16F 9/504* (2013.01); *B60G 13/003* (2013.01); *B60G 13/08* (2013.01); *F16F 9/3484* (2013.01); *F16F 9/532* (2013.01); *F16F 9/535* (2013.01); *F16F 9/54* (2013.01); *F16F 13/106* (2013.01); *B60G 2202/24* (2013.01); *B60G 2204/128* (2013.01); *B60G 2500/10* (2013.01); *F16F 2222/08* (2013.01); *F16F 2222/12* (2013.01); *F16F 2224/043* (2013.01); *F16F 2224/045* (2013.01); *F16F 2228/10* (2013.01)

(58) Field of Classification Search
CPC ........ F16F 9/53; F16F 9/532; F16F 2224/043; F16F 2224/045; F16F 13/305; F16F 9/346; F16F 13/1427; F16F 13/30; F16F 2222/12; B60G 13/08; B60G 2500/10
USPC ..................................................... 188/267.1
See application file for complete search history.

(56) References Cited

U.S. PATENT DOCUMENTS 3,658,314 A * 4/1972 Luzsicza ................. F16F 13/20
 248/562
4,159,091 A * 6/1979 Le Salver ............. F16F 9/3415
 248/634

(Continued)

OTHER PUBLICATIONS

Urbaniak, Christopher Roman, "Conceptualisation and Analysis of an Automotive Shock Absorber with Integrated Hydraulic Mount," Master's Thesis, University of Waterloo, Waterloo, Ontario, Canada, 2006, 117 pages.

(Continued)

*Primary Examiner* — Bradley T King
*Assistant Examiner* — Mahbubur Rashid
(74) *Attorney, Agent, or Firm* — Raymond Coppiellie; Hanley, Flight & Zimmerman, LLC

(57) ABSTRACT

No numbers found in figures. An example vehicular shock absorbing apparatus includes a shock absorber, a hydraulic mount operatively coupled with the shock absorber, a first decoupler movably disposed in a first portion of the hydraulic mount, and a second decoupler movably disposed in a second portion of the hydraulic mount.

20 Claims, 10 Drawing Sheets

(51) Int. Cl.
*F16F 9/348* (2006.01)
*F16F 9/53* (2006.01)

(56) References Cited

U.S. PATENT DOCUMENTS

| | | | | |
|---|---|---|---|---|
| 4,234,172 A * | 11/1980 | Takahashi | ............... | B60G 15/00 |
| | | | | 188/298 |
| 4,364,582 A * | 12/1982 | Takahashi | ............ | B60G 15/067 |
| | | | | 188/298 |
| 4,401,298 A * | 8/1983 | Eaton | ...................... | F16F 13/20 |
| | | | | 248/562 |
| 4,420,060 A * | 12/1983 | Kakimoto | ............. | F16F 13/105 |
| | | | | 180/300 |
| 4,422,779 A * | 12/1983 | Hamaekers | ............. | F02N 15/08 |
| | | | | 267/140.11 |
| 4,458,888 A * | 7/1984 | Wolf | ........................ | F16F 13/18 |
| | | | | 267/140.12 |
| 4,583,723 A * | 4/1986 | Ozawa | ..................... | F16F 13/26 |
| | | | | 188/267 |
| 4,595,183 A * | 6/1986 | Dan | ......................... | F16F 13/20 |
| | | | | 267/140.13 |
| 4,647,023 A * | 3/1987 | Ray | ....................... | F16F 13/106 |
| | | | | 267/140.13 |
| 4,671,227 A * | 6/1987 | Hollerweger | ........... | F16F 13/26 |
| | | | | 180/312 |
| 4,708,329 A * | 11/1987 | Tabata | .................... | F16F 13/10 |
| | | | | 267/140.13 |
| 4,720,087 A * | 1/1988 | Duclos | .................... | F16F 13/30 |
| | | | | 188/267.1 |
| 4,733,854 A * | 3/1988 | Miyamoto | ............... | F16F 13/16 |
| | | | | 267/140.13 |
| 4,850,578 A * | 7/1989 | Katayama | ............... | F16F 13/10 |
| | | | | 188/379 |
| 4,880,215 A * | 11/1989 | Katayama | ............... | F16F 13/10 |
| | | | | 267/140.13 |
| 4,889,325 A * | 12/1989 | Flower | .................. | F16F 13/106 |
| | | | | 267/140.13 |
| 4,896,752 A * | 1/1990 | Shtarkman | ............. | B60G 15/00 |
| | | | | 188/266.1 |
| 4,903,951 A * | 2/1990 | Miyamoto | ............ | F16F 13/103 |
| | | | | 267/140.13 |
| 4,971,300 A * | 11/1990 | Ticks | ...................... | F16F 13/10 |
| | | | | 267/140.13 |
| 4,981,286 A * | 1/1991 | Kato | .................. | C10M 171/001 |
| | | | | 188/267.1 |
| 4,991,826 A * | 2/1991 | Hoying | ................... | F16F 13/30 |
| | | | | 267/140.14 |
| 5,004,215 A * | 4/1991 | Aubry | ..................... | B64C 27/51 |
| | | | | 180/312 |
| 5,009,402 A * | 4/1991 | Sato | ........................ | F16F 13/30 |
| | | | | 267/140.14 |
| 5,052,510 A | 10/1991 | Gossman | | |
| 5,112,032 A * | 5/1992 | Klein | .................... | F16F 13/105 |
| | | | | 180/312 |
| 5,246,212 A * | 9/1993 | Funahashi | ............... | F16F 13/26 |
| | | | | 180/312 |
| 5,273,261 A | 12/1993 | Hamberg et al. | | |
| 5,314,173 A * | 5/1994 | Ide | ......................... | F16F 13/26 |
| | | | | 267/140.14 |
| 5,454,451 A * | 10/1995 | Kawamata | ......... | B60G 17/0152 |
| | | | | 188/267.1 |
| 5,492,311 A * | 2/1996 | Kurr | ...................... | F16F 13/26 |
| | | | | 267/122 |
| 6,176,477 B1 * | 1/2001 | Takeo | ................... | F16F 13/105 |
| | | | | 267/140.11 |
| 6,412,761 B1 * | 7/2002 | Baudendistel | ........ | F16F 13/105 |
| | | | | 267/140.14 |
| 6,485,005 B1 * | 11/2002 | Tewani | ................... | F16F 13/20 |
| | | | | 267/140.13 |
| 6,631,893 B2 * | 10/2003 | Hermann | ............. | F16F 13/105 |
| | | | | 267/140.13 |
| 6,808,168 B2 * | 10/2004 | Muramatsu | ............ | F16F 13/26 |
| | | | | 267/140.13 |
| 8,240,644 B2 * | 8/2012 | Lemaire | ................ | F16F 13/106 |
| | | | | 267/140.13 |
| 9,273,744 B2 * | 3/2016 | West | ........................ | F16F 9/10 |
| 9,719,575 B2 * | 8/2017 | Kojima | ................... | F16F 13/18 |
| 2002/0005607 A1* | 1/2002 | Muramatsu | ........... | F16F 13/106 |
| | | | | 267/140.11 |
| 2004/0154524 A1* | 8/2004 | Fedders | ................ | B63B 29/06 |
| | | | | 114/363 |
| 2005/0046137 A1 | 3/2005 | Dreff | | |
| 2005/0121269 A1* | 6/2005 | Namuduri | ................ | F16F 9/53 |
| | | | | 188/267.1 |
| 2010/0102492 A1* | 4/2010 | Lee | ......................... | F16F 13/26 |
| | | | | 267/121 |
| 2010/0116606 A1* | 5/2010 | Stork | ...................... | F16F 9/532 |
| | | | | 188/267.1 |
| 2010/0225527 A1* | 9/2010 | Talty | ...................... | B60G 13/14 |
| | | | | 342/145 |
| 2012/0132492 A1* | 5/2012 | Kim | ..................... | F16F 13/305 |
| | | | | 188/267.2 |

OTHER PUBLICATIONS

Continental, "Optimum Damping Through Hydraulic Resistance," ContiTech Press Release, Shanghai, Oct. 2014, 3 pages.
Adiguna et al., "Transient response of a hydraulic engine mount," Journal of Sound and Vibration 268 (2003) 217-248, 32 pages.

* cited by examiner

VEHICULAR VIBRATION ISOLATION SYSTEM AND APPARATUS

FIELD OF THE DISCLOSURE

This disclosure relates generally to shock absorbers and, more particularly, to vehicle shock absorbers used in suspension and steering systems.

BACKGROUND

FIG. 1A shows an example vehicle 100 having a suspension system using shock absorbers (e.g., telescopic dampers) 110. The shock absorbers 110 regulate suspension movement and help to maintain the wheels 120 in contact with the ground at all times, as well as to reduce bounce, roll and sway. The shock absorbers 110 also help to reduce brake dive, acceleration squat and to dampen or isolate road induced disturbances having a low frequency (e.g., between about 0 Hz-30 Hz) and a high amplitude. Conventional shock absorbers isolate vibrations related to vehicle wheel and body excitation inputs in the range of about 5-14 Hz, with higher frequency excitation inputs having smaller amplitudes being transmitted to the vehicle structure.

In various suspension system configurations, the shock absorbers 110 may be integrated with struts and coils (e.g., MacPherson struts in a MacPherson front suspension, etc.) or may be provided separately thereto (e.g., coil spring suspension system). For example, in coil spring suspension systems, the shock absorber is connected at a first end to the chassis or frame and at another end to the upper control arm (e.g., short-arm) or the lower control arm (e.g., long-arm), which are connected to a wheel hub via wheel spindles and ball joints. A coil spring works against one of the control arms (e.g., lower control arm for Type 1 Coil Spring or double wishbone suspension, upper control arm for Type 2 Coil Spring) to support the weight of the vehicle via a ball joint (e.g., via the lower ball joint in the Type 1 Coil Spring or via the upper ball joint in the Type 2 Coil Spring), and the shock absorber controls spring oscillations. In MacPherson strut suspensions, the upper control arm is omitted. A strut assembly including a strut, spring and shock absorber is disposed to connect the shock absorber, at a first end, to the chassis or frame and, at the other end, to a ball joint at the lower control arm. In a MacPherson strut suspension, the strut bears the load of the vehicle weight.

Shock absorbers 110 are conventionally selected to provide a desired response (e.g., compression and rebound performance) and balance to address primary ride perturbations affecting rigid body motion of the passenger compartment relative to the road, arising from high-amplitude, low-frequency events, such as potholes and speed bumps. Shock absorbers 110 are not conventionally tuned to address secondary ride perturbations having a low amplitude and a high frequency (e.g., road noise).

FIG. 1B shows an example truck 130 using shock absorbers 140 as steering stabilizers or steering dampers. Shock absorbers 140 help dampen lateral or side-to-side movement in a vehicle's suspension to reduce vibration, steering wobble or shimmy and bump steer and to make heavier vehicles (e.g., trucks, RV's, etc.) easier to drive over rough terrain as well as at highway speeds, particularly if the vehicle is heavily laden or towing a load.

FIG. 2 shows a hydraulic engine mount (HEM) 200, which is disposed between an engine and a frame of a vehicle to isolate vibration from the engine and reduce the engine vibration felt inside the vehicle. The HEM 200 is mounted to the engine through the top mounting studs 201 and to the frame through the bottom mounting studs 202. The HEM 200 includes metal inserts 203, 204 to support the forces and torques generated by the engine and an elastomeric element 205 or matrix to dampen vibrations and enable compression and shear displacement or elastic deformation. The upper chamber 207 and a lower chamber 208 are filled with an operating fluid comprising a mixture of ethylene glycol (anti-freeze) and distilled water. Upon compression of the upper chamber 207, the operating fluid is forced to flow through fluid pathways in an orifice plate 211. A first fluid pathway is formed by inertia tracks 212, which are long channels having a small cross-sectional area to provide a high level of fluid damping or resistance to fluid flow to control, for example, engine resonances. A second fluid pathway is formed by a decoupler 213, a free-floating, thin disk disposed in the orifice plate 211 to move between a top portion and a bottom portion of the orifice plate 211 and to occlude orifices 214 in the orifice plate 211 at those positions. The orifice plate 211 positioned between the upper chamber 207 and lower chamber 208 controls the fluid system characteristics. Minor changes in the geometry and flow conditions of the orifice plate 211 can significantly influence dynamic behavior. A flexible diaphragm 215 functions as an accumulator as the fluid flows from the upper chamber 207 to the lower chamber 208. A vent 216 allows air to escape from a base plate 217 responsive to movement of the flexible diaphragm 215.

SUMMARY

In one example, a vehicular shock absorbing apparatus includes a shock absorber, a hydraulic mount operatively coupled with the shock absorber, a first decoupler movably disposed in a first portion of the hydraulic mount, and a second decoupler movably disposed in a second portion of the hydraulic mount.

In another example, an apparatus includes one or more orifice plates disposed in a hydraulic mount to separate an interior volume of the hydraulic mount into a plurality of chambers, a first decoupler movably disposed in the one or more orifice plates, a second decoupler movably disposed in the one or more orifice plates and an operating fluid disposed to flow between the plurality of chambers through the first decoupler or the second decoupler during compression or extension of the hydraulic mount.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Disclosed herein are example hydraulic mounts for a vehicular shock absorber, such as used in a vehicle suspension system or a vehicle steering system, and example shock absorbers incorporating such example hydraulic mounts. The disclosed hydraulic mounts and shock absorbers including such hydraulic mounts enable the creation of a passive broadband shock absorber addressing both lower frequency (e.g., 0-30 Hz) and higher frequency (e.g., 30-100 Hz) vibrations affecting ride comfort, generally denoted as Noise, Vibration and Harshness (NVH). In some examples, the hydraulic mounts disclosed herein are tuned to isolate frequencies of vibration between about 30 Hz and about 100 Hz to isolate vibrations having a higher frequency and lower amplitude than the vibrations to which the shock absorber is tuned to isolate. Conventional shock absorbers isolate vibrations related to vehicle wheel and body frequencies in the range of about 5-14 Hz. Higher frequency excitation inputs with smaller amplitudes are typically transmitted to the vehicle structure.

Figure 1A:
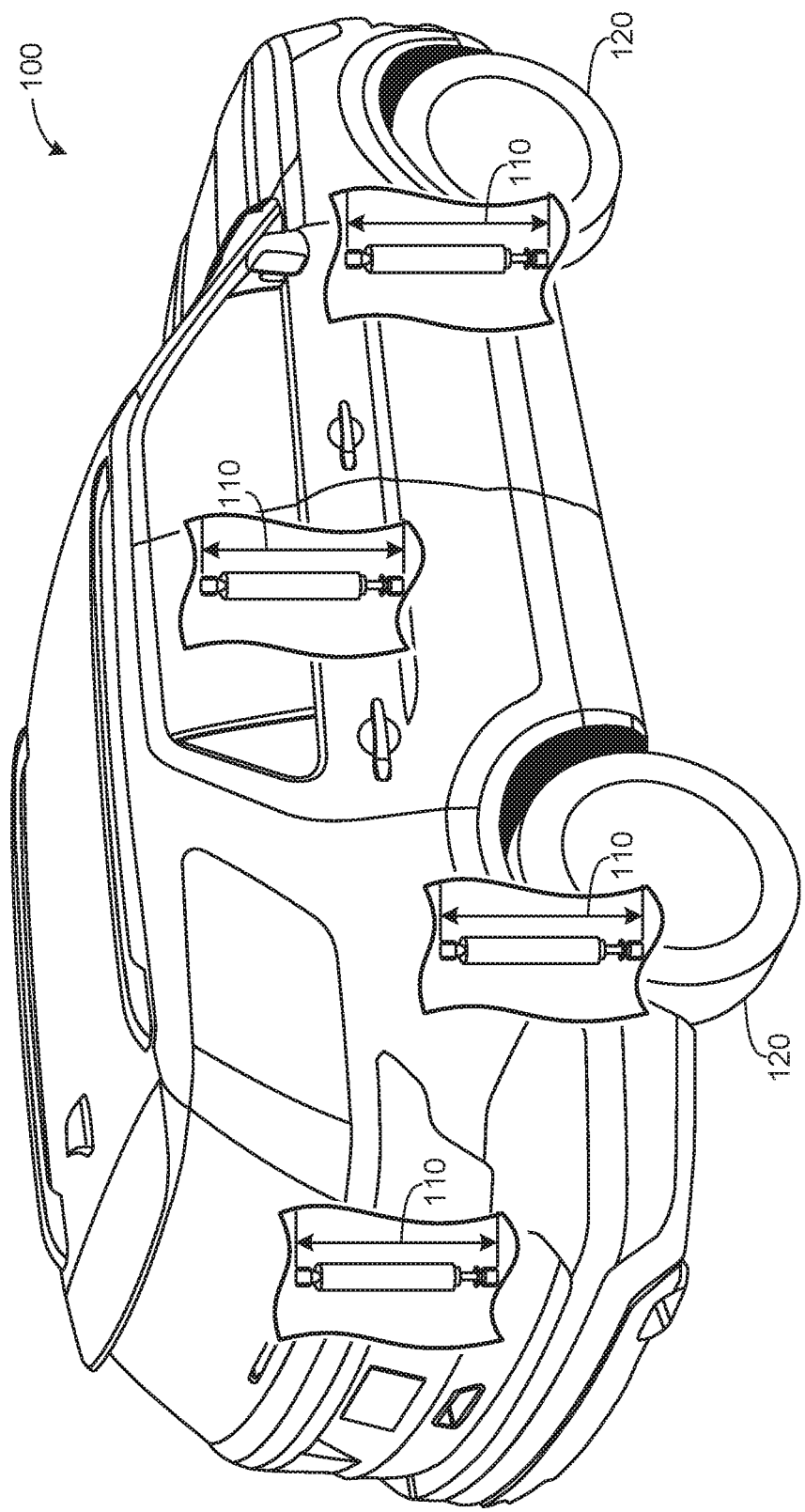
FIG. 1A depicts an example passenger vehicle suspension with conventional shock absorbers.
Figure 1B:
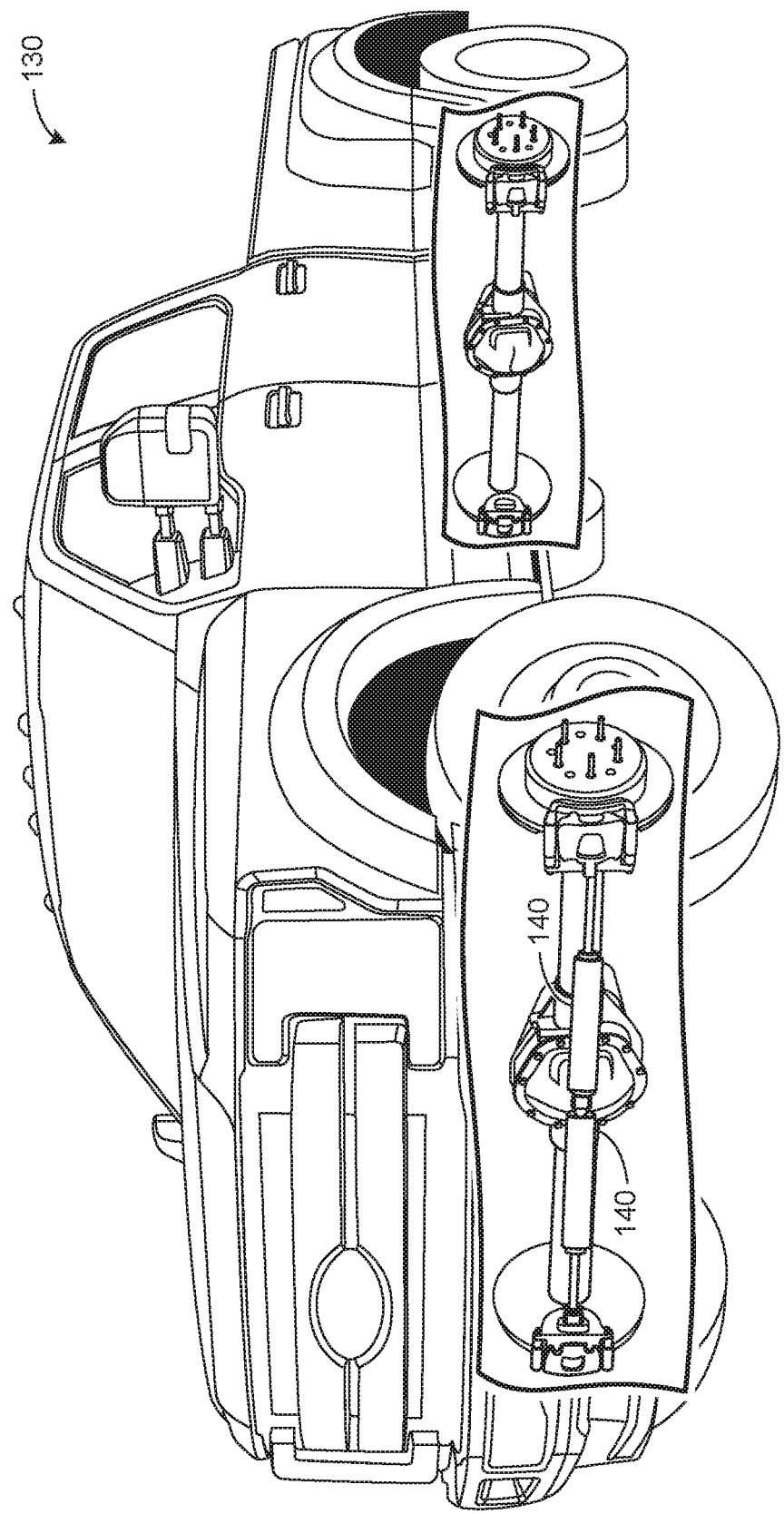
FIG. 1B depicts an example truck with conventional shock absorbers used as a steering stabilizer.
Figure 2:
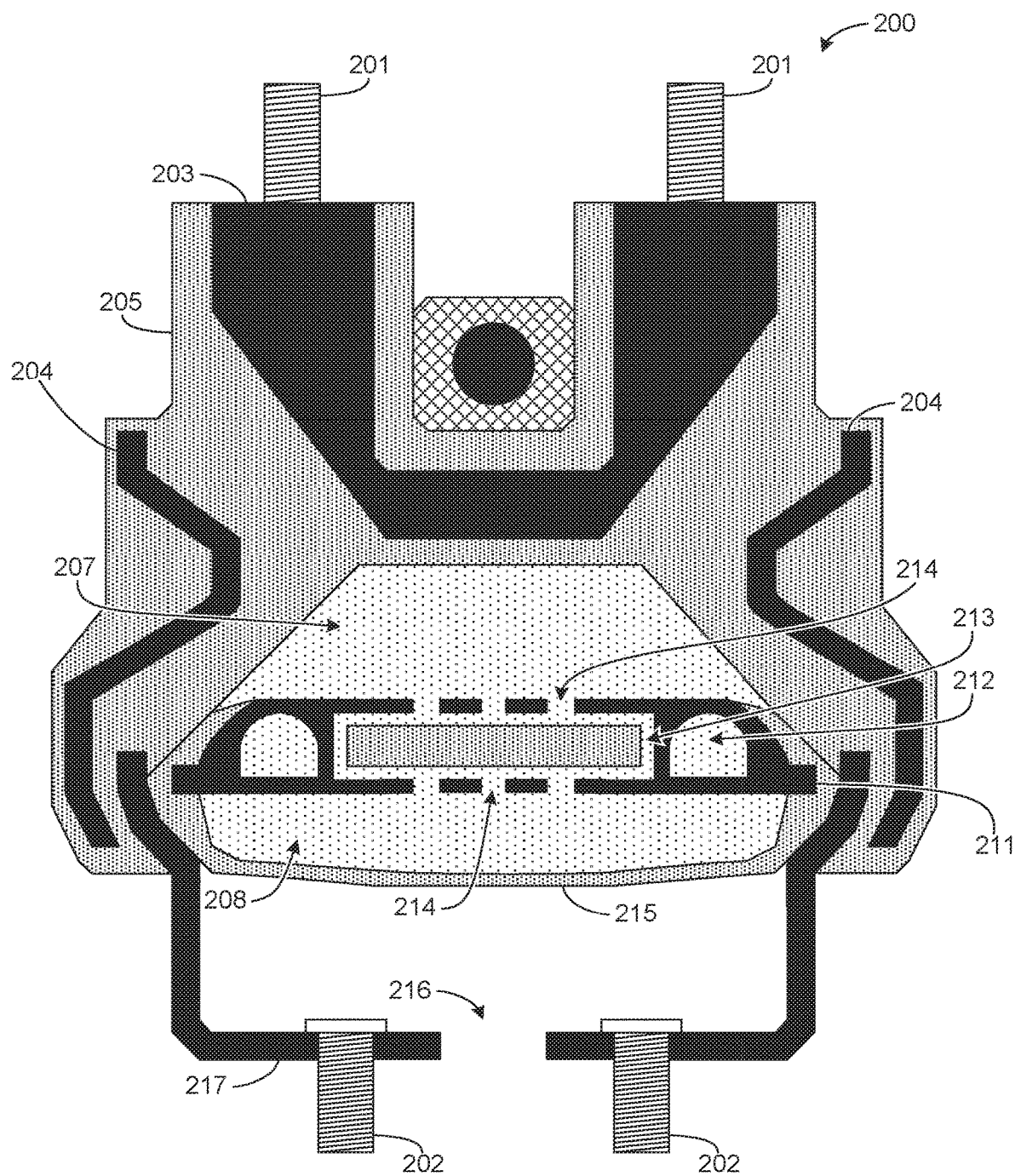
FIG. 2 is an example conventional passive hydraulic engine mount.

The example hydraulic mounts and example shock absorbers using such hydraulic mounts disclosed herein facilitate a substantial isolation of small vibrations regardless of the initial motion direction of the shock absorber. The example hydraulic mounts are specifically configured to account for initial positioning of decouplers within the hydraulic mount. A conventional HEM, such as the HEM shown in FIG. 2, facilitates hydraulic fluid flow between the upper chamber 207 and lower chamber 208 when the decoupler 213 is floating between the top and bottom portions of the orifice plate under the influence of cyclic engine vibrations of small magnitude and high frequency. Given the function and operation of the HEM 200, an initial position of the decoupler 213 is irrelevant. However, for the example hydraulic mounts disclosed herein, which are advantageously incorporated in a vehicle suspension system shock absorber to isolate vibrations impacting secondary ride, a proper initial position of the decoupler is important to guarantee immediate flow and operability.

Figure 3:
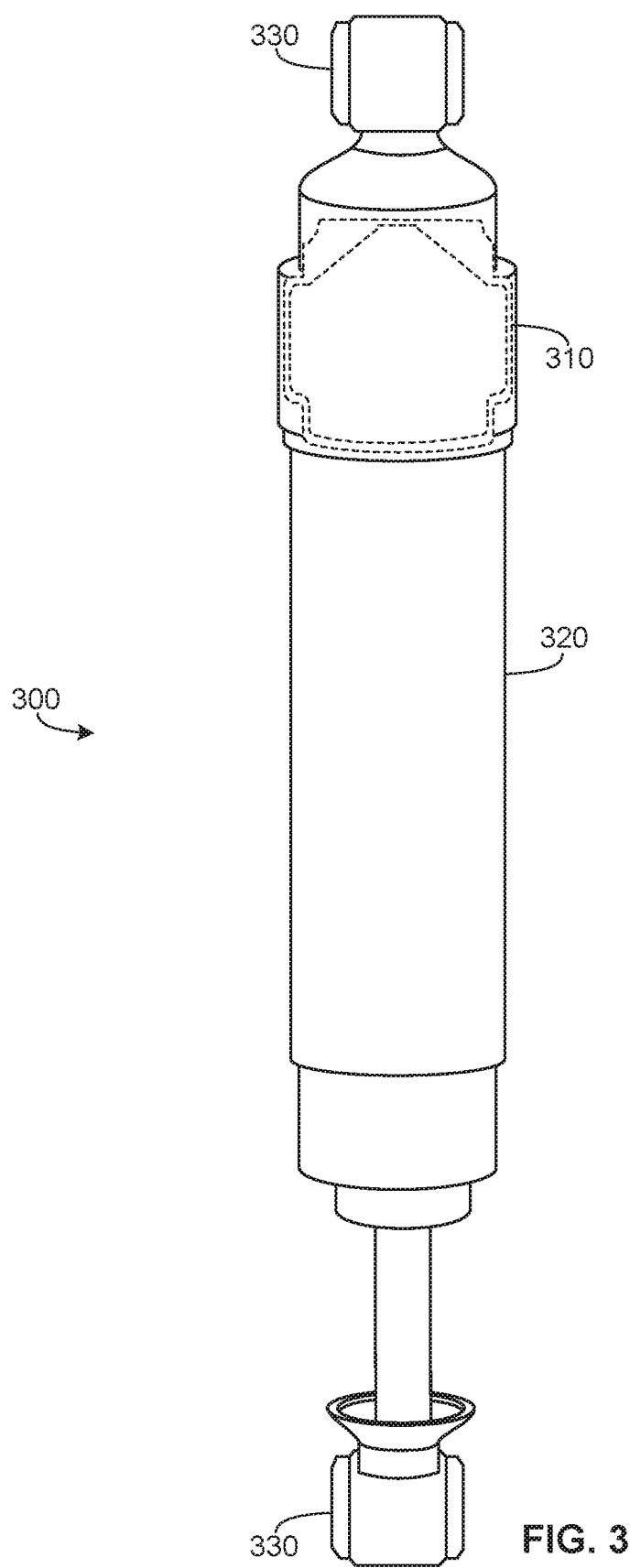
FIG. 3 is an example shock absorbing apparatus having an example hydraulic mount in accordance with teachings of this disclosure.
Figure 4:
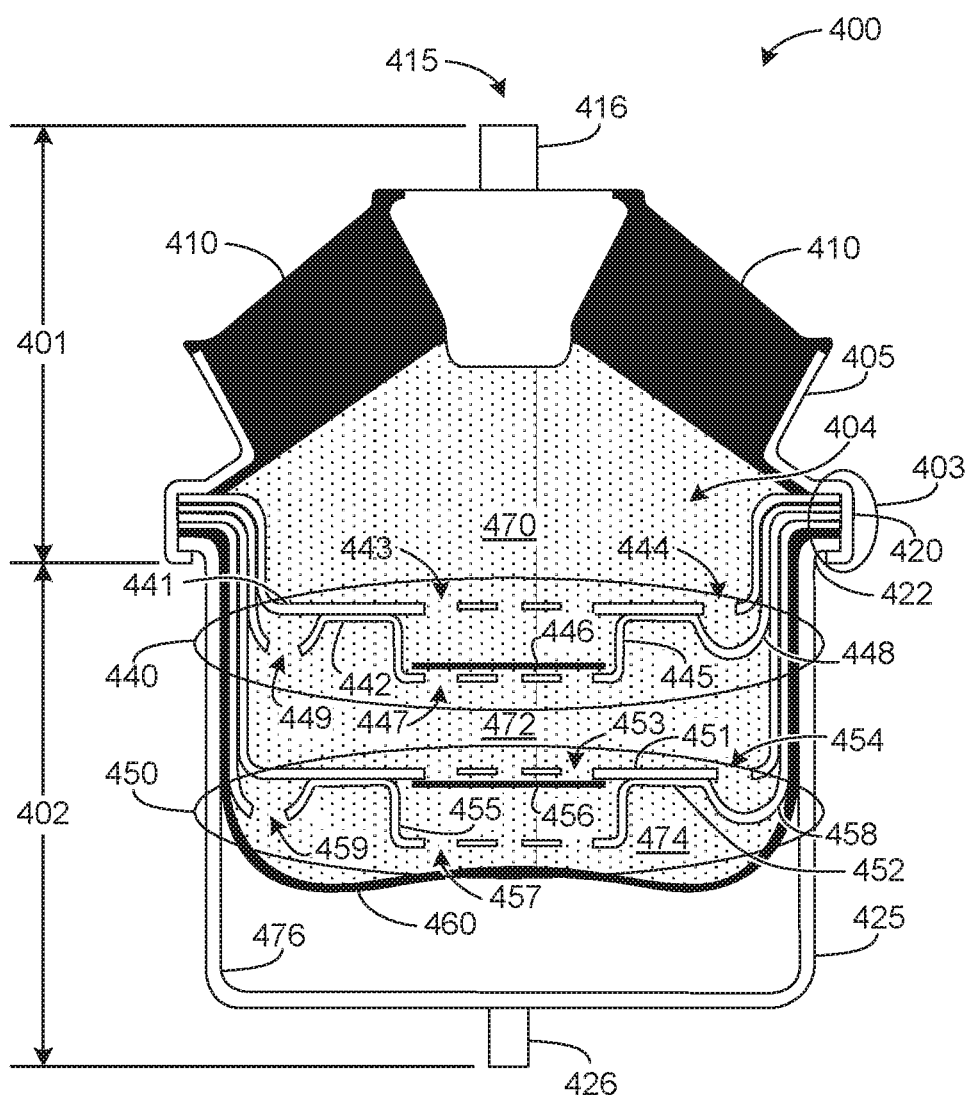
FIG. 4 is an example hydraulic mount that may be used in the example shock absorbing apparatus of FIG. 3 in accordance with teachings of this disclosure.
Figure 5:
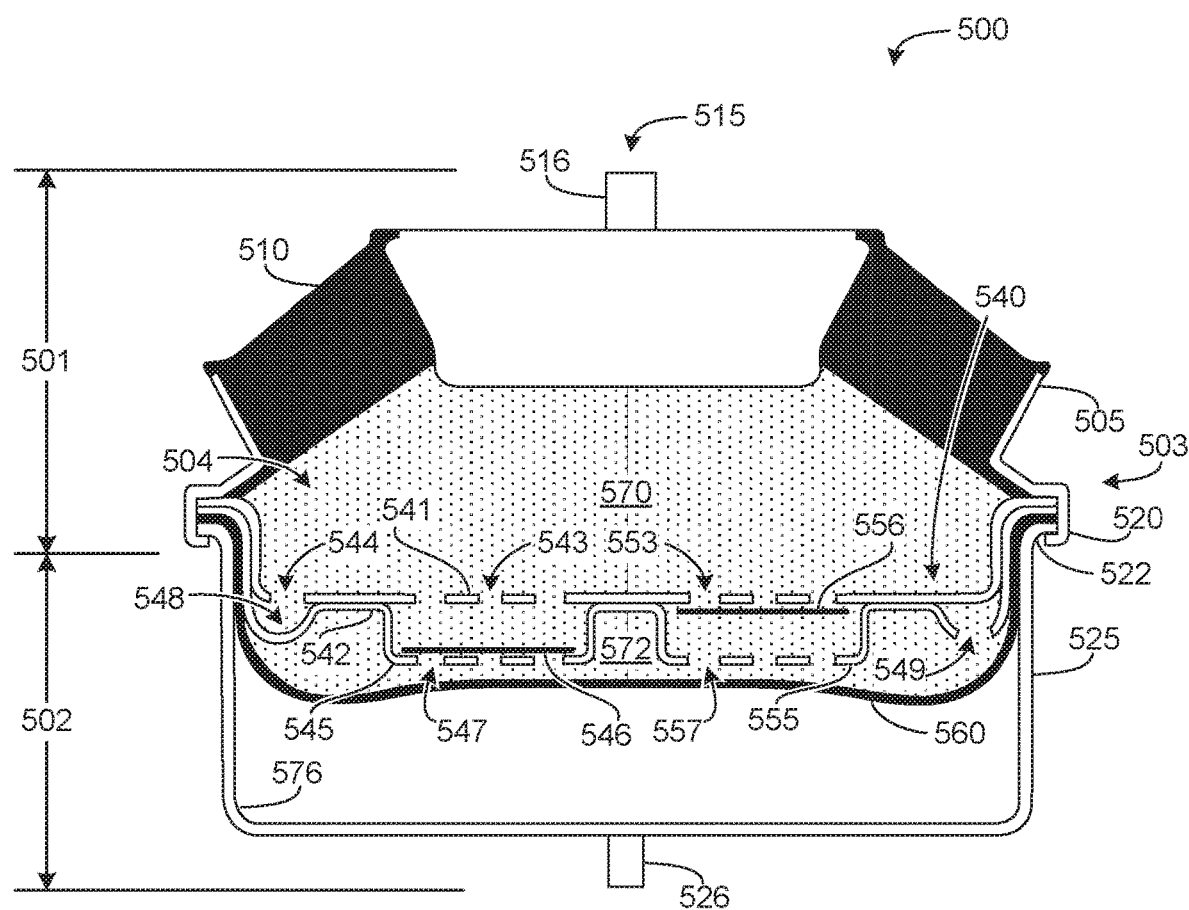
FIG. 5 is another example hydraulic mount that may be used in the example shock absorbing apparatus of FIG. 3 in accordance with teachings of this disclosure.
Figure 6:
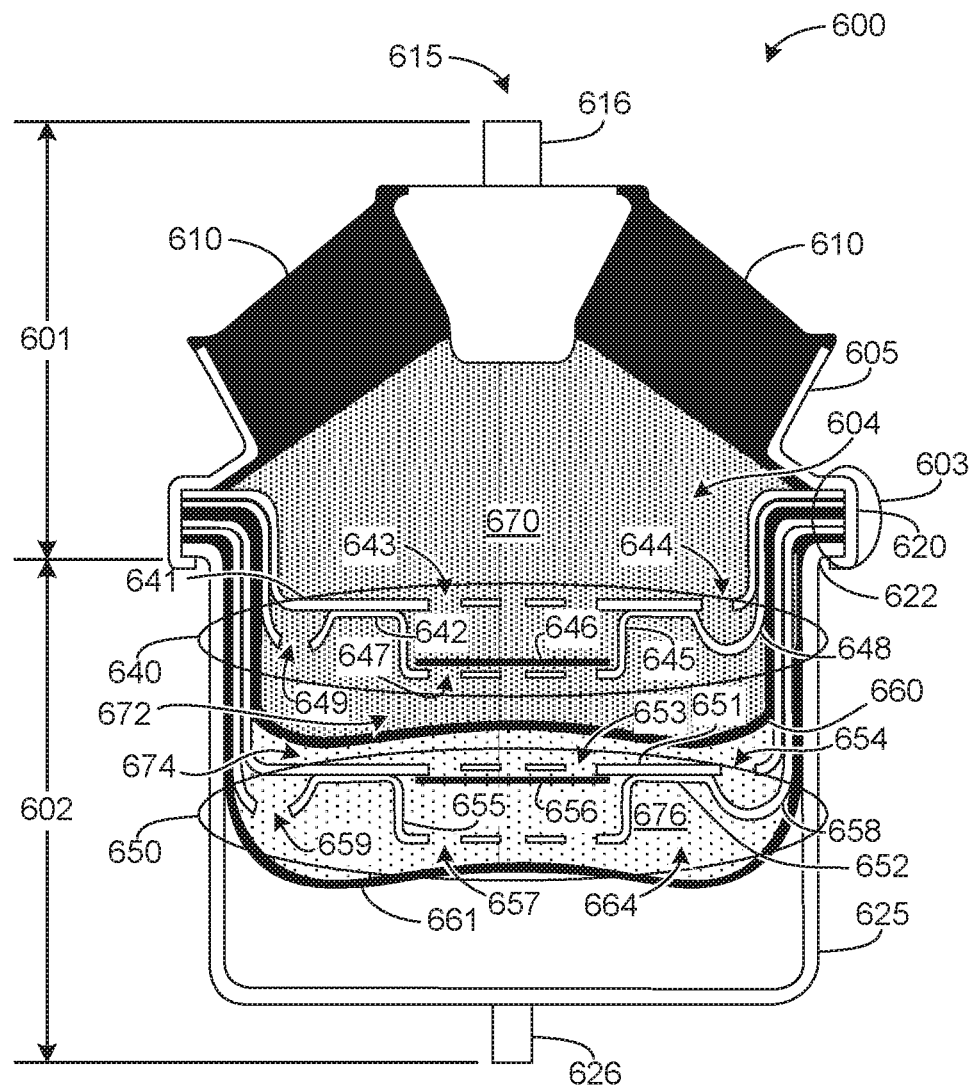
FIG. 6 is yet another example hydraulic mount that may be used in the example shock absorbing apparatus of FIG. 3 in accordance with teachings of this disclosure.

FIG. 3 illustrates an example environment of use 300 in which a hydraulic mount 310, examples of which are shown in FIGS. 4-6, is integrated with a shock absorber 320 to provide, in combination, a dampening function over a frequency range of interest (e.g., 0-100 Hz, 0-200 Hz, etc.). Example shock absorber mounts 330 are provided at each end of the shock absorber 320 to secure the shock absorber 320 to corresponding vehicle mounts, brackets, or components appropriate to the shock absorber configuration and application (e.g., a suspension shock absorber, a steering shock absorber, etc.). While ring mounts or eye/eyelet shock absorber mounts 330 are shown, alternative mounts could include, for example, a bar mounting, a bushing and stud, a bayonet/stud/pin mount for a bolt-to-nut connection, or the like.

FIG. 4 illustrates an example hydraulic mount 400 that may be integrated with a shock absorber, such as the example shock absorber 320 of FIG. 3. The hydraulic mount 400 includes a first housing portion 401 (e.g., an upper portion in the example of FIG. 4) and a second housing portion 402 (e.g., a lower portion in the example of FIG. 4, etc.) connected together to form a hydraulic seal 403 to retain an operating fluid 404 within the hydraulic mount 400.

The example first housing portion 401 shown in FIG. 4 includes an example outer housing 405 formed from a metal or metal alloy such as, for example, a steel alloy or aluminum, or from a composite material. An example annular rubber main spring 410 is disposed within, and connected or bonded to, the outer housing 405 as a compliance portion. An example first mount 415 is disposed within the annular rubber main spring 410. The first mount 415 includes an example connector 416 (e.g., a threaded stud, mechanical fastener, etc.) to facilitate connection of the hydraulic mount 400 to another component, such as a supporting bracket. In one example, the hydraulic mount 400 is integrated with a shock absorber, such as the example shock absorber 320 of FIG. 3, and the first connector 416 connects to a base portion of a shock absorber mount 330.

The first housing portion 401 includes, at an end opposite to that of the first mount 415, an example first connector 420 to facilitate connection of the first housing portion 401 to a corresponding mating second connector 422 of the second housing portion 402 to form the hydraulic seal 403. In the example shown in FIG. 4, the first connector 420 is an inwardly-directed annular channel into which the example second connector 422, an outwardly-directed flange, is received and retained, under compression, to form the hydraulic seal 403. In another example, the first connector 420 includes an outwardly-directed annular channel into which the second connector 422 is received and retained, under compression, to form the hydraulic seal 403. In still another example, the first connector 420 includes an outwardly directed flange dimensioned to engage an inwardly-directed annular channel of the second connector 422. In yet another example, the first connector 420 and the second connector 422 include mating threaded connections. In some examples, the first connector 420 and the second connector 422 include mating flanges connected by mechanical fasteners (e.g., bolts/nuts, etc.). In some examples, the hydraulic seal 403 is formed by brazing or welding the first connector 420 and the second connector 422.

The example second housing portion 402 shown in FIG. 4 includes an example outer housing 425 formed from a metal or metal alloy such as, for example, a steel alloy or aluminum, or from a composite material. The outer housings 405, 425 may be formed from the same material(s) or from different material(s). An end portion of the outer housing 425 opposite the end bearing the second connector 422 includes an example second connector 426 (e.g., a threaded stud, mechanical fastener, etc.) to facilitate connection of the hydraulic mount 400 to another component, such as a supporting bracket. In one example, the hydraulic mount 400 is integrated with a shock absorber, such as the example shock absorber 320 of FIG. 3, and the example second connector 426 is operatively coupled to a piston rod (not shown) of a shock absorber.

The compression fit connection between the first connector 420 and the second connector 422 secures outer circumferential portions of an example first orifice plate 440 including an example first plate 441 and an example second plate 442 disposed in series within the hydraulic mount 400. In some examples, the first orifice plate 440 is a unitary structure rather than a separate first plate 441 and second plate 442. The first plate 441 of the first orifice plate 440 defines one or more orifices 443 to permit passage of the operating fluid 404 therethrough. In the example of FIG. 4, a plurality of orifices 443 are provided in a central portion of the first orifice plate 440. The first plate 441 further defines an opening 444, in an outer circumferential portion, to permit passage of the operating fluid 404 therethrough.

FIG. 4 shows the second plate 442 of the first orifice plate 440 to define, in a central portion thereof, a first cage 445 (e.g., a substantially cylindrical structure, etc.) in which a first decoupler 446 is housed and movably disposed to move between the first plate 441 and the second plate 442. The first cage 445 defines one or more orifices 447 to permit passage of the operating fluid 404 therethrough. The decoupler 446 responds to pressure changes within first and second chambers 470, 472. Movement of the decoupler 446 within the first cage 445 toward and away from the first and second chambers 470, 472 accommodates movement of small volume changes between the first and second chambers 470, 472 responsive to such pressure changes.

In the example of FIG. 4, the second plate 442 of the first orifice plate 440 also defines an inertia track 448, a channel (e.g., an annular channel, etc.) extending from a first portion of the second plate 442 to a second portion of the second plate 442 (e.g., along an outer circumferential portion of the second plate 442, etc.) to provide a damping or resistance to fluid flow. An opening 449 is formed in a portion of the second plate 442, in the inertia track 448, to permit passage of the operating fluid 404 therethrough. In the example of FIG. 4, the opening 449 in the second plate 442 is formed opposite to (e.g., 180°) the opening 444 in the first plate 441, causing the operating fluid 404 to move through the depicted inertia track 448, which is annular in the example shown, from one side of the first orifice plate 440 to the opposite side. The inertia track 448 may include one or more straight or curvilinear sections and may include one or more flow restrictors (e.g., a reduced cross-sectional area, bumps or other obstructions in the flow path, etc.). Although a cross-sectional profile of the illustrated example the inertia track 448 is substantially semi-circular, one or more other cross-sectional profiles (e.g., elliptical, etc.) may be used. In some examples, the inertia track 448 is annular or spiral, depending on length, and the openings 444, 449 may be formed at varying circumferential positions from one another (e.g., 120°, 240°, 360°, 540°, etc.) to vary a path length of the operating fluid 404 through the inertia track 448. Variation of the path length and/or cross-sectional area of the inertia track 448 permits tailoring of response characteristics of the first orifice plate 440 to vehicle-specific design parameters for the example hydraulic mount 400.

The compression fit connection between the first connector 420 and the second connector 422 also secures outer circumferential portions of an example second orifice plate 450 including an example first plate 451 and an example second plate 452. In some examples, the second orifice plate 450 is a unitary plate rather than a separate first plate 451 and second plate 452. In some examples, the second orifice plate 450 is a unitary plate rather than a separate first plate 451 and second plate 452. The first plate 451 of the second orifice plate 450 defines one or more orifices 453 to permit passage of the operating fluid 404 therethrough. In the example of FIG. 4, a plurality of orifices 453 are provided in a central portion of the second orifice plate 450. The first plate 451 further defines an opening 454, in an outer circumferential portion, to permit passage of the operating fluid 404 therethrough.

FIG. 4 shows the second plate 452 of the second orifice plate 450 to define, in a central portion thereof, a second cage 455 (e.g., a substantially cylindrical structure, etc.) in which a second decoupler 456 is housed and movably disposed to move between the first plate 451 and the second plate 452. The second cage 455 defines one or more orifices 457 to permit passage of the operating fluid 404 therethrough. In the example of FIG. 4, the orifices 457 are provided in a central portion of the second cage 455. The second plate 452 of the second orifice plate 450 also defines an inertia track 458, a channel extending from a first portion of the second plate 452 to a second portion of the second plate to provide a damping or resistance to fluid flow. An opening 459 is formed in a portion of the second plate 452, in the inertia track 458, to permit passage of the operating fluid 404 therethrough. In the example of FIG. 4, the opening 459 in the second plate 452 is formed opposite to (e.g., 180°) the opening 454 in the first plate 451, causing the operating fluid 404 to move through the depicted annular inertia track 458 from one side of the first orifice plate 450 to the opposite side. The inertia track 458 may include one or more straight or curvilinear sections. In some examples, the inertia track 458 is annular or spiral, depending on length, and the openings 444, 449 may be formed at varying circumferential positions from one another (e.g., 120°, 240°, 360°, 540°, etc.) to vary a path length of the operating fluid 404 through the inertia track 458. The variation of the path length and/or cross-sectional area of the inertia track 458 permits tailoring of response characteristics of the first orifice plate 450 to vehicle-specific design parameters for the example hydraulic mount 400.

The compression fit connection between the first connector 420 and the second connector 422 further secures outer circumferential portions of an example diaphragm 460 as a second compliance member, defining a flexible fluid boundary. The diaphragm 460, formed from a resilient material, such as rubber, extends along an inner surface 476 of the second housing portion 425 to a position beneath the second orifice plate 450.

In the above described arrangement, shown in FIG. 4, the first chamber 470 is defined between the first orifice plate 440 and the first housing portion 401, the second chamber 472 is defined between the first orifice plate 440 and the second orifice plate 440, and a third chamber 474 is defined between the second orifice plate 440 and the diaphragm 460. Thus, the hydraulic mount 400 of FIG. 4 uses a plurality of orifice plates 440, 450 and a diaphragm to define a plurality of chambers in an interior volume of the hydraulic mount 400.

It can be observed in FIG. 4 that a position of the first decoupler 446 in the first cage 445 is different than a position of the second decoupler 456 in the second cage 455. In FIG. 4, the first decoupler 446 is shown to be adjacent the second plate 442 of the first orifice plate 440 in a position occluding the orifice(s) 447, whereas the second decoupler 456 is shown to be adjacent the first plate 451 of the second orifice plate 450 in a position occluding the orifice(s) 453. This difference is attributable to the design of the first decoupler 446 and the second decoupler 456. The first decoupler 446 has a density greater than a density of the operating fluid 404 to bias the first decoupler 446 toward a first default position adjacent the second plate 442 of the first orifice plate 440 in a position occluding the orifice(s) 447. Where the operating fluid 404 is a mixture of distilled water and ethylene glycol, a density of the mixture ranges between 1.00 g/cm³ and about 1.113 g/cm³ depending on the relative concentrations of distilled water and ethylene glycol. For example, if a density of the operating fluid 404 is 1.06 g/cm³, a density of the first decoupler 446 is greater than 1.06 g/cm³, such as, for example, 1.08 g/cm³ to 1.2 g/cm³. In such example, the first decoupler 446 may include an elastomeric material (e.g., a rubber). Thus, because the density of the first decoupler 446 in this example is greater than that of the operating fluid 404, the first decoupler 446 tends to sink within the first cage 445 toward a default position at a bottom of the first cage 445.

The second decoupler 456 has a density less than a density of the operating fluid 404 to bias the second decoupler 456 toward a second default position adjacent the first plate 451 of the second orifice plate 450 in a position occluding the orifice(s) 453. Where the operating fluid 404 is a mixture of distilled water and ethylene glycol, as in the example above, with an example density of 1.06 g/cm³, an example density of the second decoupler 456 is less than 1.06 g/cm³, such as, for example, 0.90 g/cm³ to about 1.05 g/cm³. In such example, the second decoupler 456 may include a composite material (e.g., a composite of an elastomeric material and a low density core (e.g., cork, wood, etc.) to provide a density less than the noted example. Thus, because the density of the second decoupler 456 in this example is less than that of the operating fluid 404, the second decoupler 456 tends to float within the second cage 455 toward a default position at a top of the second cage 455.

As a result of the compression or extension of the hydraulic mount 400, the operating fluid 404 flows between the first chamber 470, the second chamber 472 and third chamber 474 in a direction corresponding to a direction of the force to the hydraulic mount 400. In operation, elastic deformation of the example annular rubber main spring 410 and the example first mount 415 under an applied compressive or tensile force acts as a piston upon the operating fluid 404 in the first chamber 470. Under a tensile force, for example, a negative pressure is developed in the first chamber 470 by movement of the annular rubber main spring 410 and the first mount 415 (e.g., a piston), causing the operating fluid 404 to flow from the second chamber 472 into the first chamber 470 through the inertia track 448 (via the openings 444, 449) and the orifices 443, 447 and from the third chamber 474 into the second chamber 472 through the inertia track 458.

To illustrate an example application of a tensile force to the hydraulic mount 400, a negative pressure in the first chamber 470 arising from application of the tensile force draws the first decoupler 446, in an initial position in the first cage 445 adjacent the second plate 442, away from the second plate 442 to create a low resistance flow path from the second chamber 472 to the first chamber 470 through the orifices 443, 447. At this point, flow through the higher resistance inertia track 448 from the second chamber 472 to the first chamber 470 is negligible. If the flow path through the orifices 443, 447 is not sufficient to equalize the pressure and the first decoupler 446 is drawn against the first plate 441 to occlude the orifices 443, a resistance of the inertia track 448 is overcome and a flow path is established from the second chamber 472 to the first chamber 470 through the inertia track 448. In this example, flow of the operating fluid 404 from the third chamber 474 to the second chamber 472 is only through the inertia track 458, as the second decoupler 456 is initially in its default position biased against the first plate 451 to occlude the orifices 453 and block flow therethrough.

Conversely, to illustrate an example application of a compressive force to the hydraulic mount 400, a positive pressure in the first chamber 470 arising from application of the compressive force biases the first decoupler 446, already in an initial position in the first cage 445 adjacent the second plate 442, against the second plate 442 to prevent flow through the orifices 443, 447. The only available flow path from the first chamber 470 to the second chamber 472 is through the relatively high-resistance inertia track 448. As pressure builds in the second chamber 472 due to the flow of the operating fluid 404 into the second chamber 472 through the inertia track 448, the increased pressure biases the second decoupler 456, in a default position adjacent the first plate 451, away from the orifices 453 to open a low resistance flow path, compared to a flow path through inertia track 458, from the second chamber 472 to the third chamber 474 through the orifices 453, 457. The diaphragm 460 expands responsive to an increasing pressure in the third chamber 474. With a sufficient pressure differential between the second chamber 472 and the third chamber 474, the second decoupler 456 is biased against the second plate 452, occluding the orifices 457 to close the low resistance flow path through the orifices 453, 457 and further flow from the second chamber 472 to the third chamber 474 is through inertia track 458.

The example hydraulic mount 400 having two orifice plates 440, 450, and associated decouplers 446, 456 and inertia tracks 448, 458, provides fluid communication of the operating fluid 404 between three chambers, offering additional degrees of freedom in isolation design optimization to permit, for example, tailoring the hydraulic mount 400 to exhibit different damping characteristics in different directions of motion. Additionally, because one decoupler (e.g., the first decoupler 446) has a higher density than the operating fluid 404 and the other decoupler (e.g., the second decoupler 456) has lower density than the operating fluid 404, the shock absorber and hydraulic mount (e.g., 300; FIG. 3) combination will always guarantee an initial open flow, or an initial low-resistance flow path, regardless of the whether an initial shock absorber motion is in compression or extension. As soon as this initial open flow of the operating fluid is established between chambers (e.g., between the first chamber 470 and the second chamber 472, etc.), isolation of the small amplitude and relatively higher frequency vibrations by the hydraulic mount 400 immediately commences.

FIG. 5 illustrates another example hydraulic mount 500 that may be integrated with a shock absorber, such as the example shock absorber 320 of FIG. 3. The hydraulic mount 500 includes a first housing portion 501 (e.g., an upper portion in the example of FIG. 5) and a second housing portion 502 (e.g., a lower portion in the example of FIG. 5, etc.) connected to form a hydraulic seal 503 to retain an operating fluid 504 within the hydraulic mount 500.

The example first housing portion 501 shown in FIG. 5 includes an example outer housing 505 formed from a metal or metal alloy such as, for example, a steel alloy or aluminum, or from a composite material. An example annular rubber main spring 510 is disposed within, and connected or bonded to, the outer housing 505 as a compliance portion. An example first mount 515 is disposed within the annular rubber main spring 510. The first mount 515 includes an example connector 516 (e.g., a threaded stud, mechanical fastener, etc.) to facilitate connection of the hydraulic mount 500 to another component, such as a supporting bracket. In one example, the hydraulic mount 500 is integrated with a shock absorber, such as the example shock absorber 320 of FIG. 3, and the first connector 516 connects to a base portion of a shock absorber mount 330.

The first housing portion 501 includes, at an end opposite to that of the first mount 515, an example first connector 520 to facilitate connection of the first housing portion 501 to a corresponding mating second connector 522 of the second housing portion 502 to form the hydraulic seal 503. In the example shown in FIG. 5, the first connector 520 is an inwardly-directed annular channel into which the example second connector 522, an outwardly-directed flange, is received and retained, under compression, to form the hydraulic seal 503. Similar to the example hydraulic mount 400 described above, the first connector 520 and the second connector 522 may be variously configured to utilize different forms of mechanical connection to form the hydraulic seal 503.

The example second housing portion 502 shown in FIG. 5 includes an example outer housing 525 formed from a metal or metal alloy such as, for example, a steel alloy or aluminum, or from a composite material. The outer housings 505, 525 may be formed from the same material(s) or from different material(s). An end portion of the outer housing 525 opposite the end bearing the second connector 522 includes an example second connector 526 (e.g., a threaded stud, mechanical fastener, etc.) to facilitate connection of the hydraulic mount 500 to another component, such as a supporting bracket. In one example, the hydraulic mount 500 is integrated with a shock absorber, such as the example shock absorber 320 of FIG. 3, and the example second connector 526 is operatively connected to a piston rod (not shown) of a shock absorber.

The compression fit connection between the first connector 520 and the second connector 522 secures outer circumferential portions of an example orifice plate 540 including an example first plate 541 and an example second plate 542. In some examples, the orifice plate 540 is a unitary structure rather than a separate first plate 541 and second plate 542. The first plate 541 of the orifice plate 540 defines one or more orifices 543 in a first portion of the first plate 541 and one or more orifices 547 in a second portion of the first plate 541. The orifices 543, 547 permit passage of the operating fluid 504 therethrough. The first plate 541 further defines an opening 544, in an outer circumferential portion, to permit passage of the operating fluid 504 therethrough.

FIG. 5 shows a first cage 545 (e.g., a substantially cylindrical structure, etc.) formed in a first portion of the second plate 542 corresponding in position to the first portion of the first plate 541 defining the orifice(s) 543. FIG. 5 also shows a second cage 555 (e.g., a substantially cylindrical structure, etc.) formed in a second portion of the second plate 542 corresponding in position to the second portion of the first plate 541 defining orifice(s) 553. A first decoupler 546 is housed and movably disposed in the first cage 545 to move between the first plate 541 and the second plate 542. The first cage 545 defines one or more orifices 547 to permit passage of the operating fluid 504 therethrough. In the example of FIG. 5, the orifice(s) 547 are provided in a central portion of the first cage 545. The second plate 542 of the orifice plate 540 also defines an inertia track 548, a channel (e.g., an annular channel, etc.) extending from a first portion of the second plate 542 to a second portion of the second plate 542 (e.g., along an outer circumferential portion of the second plate 542, etc.) to provide a damping or resistance to fluid flow. An opening 549 is formed in a portion of the second plate 542, in the inertia track 548, to permit passage of the operating fluid 504 therethrough. In the example of FIG. 5, the opening 549 in the second plate 542 is formed opposite to (e.g., circumferentially spaced 180° relative to) the opening 544 in the first plate 541, thereby causing the operating fluid 504 to move through the depicted annular inertia track 548 from one side of the orifice plate 540 to the opposite side. The inertia track 548 may include one or more straight or curvilinear sections and may include one or more flow restrictors (e.g., a reduced cross-sectional area, bumps in the flow path, etc.). Although a cross-sectional profile in the illustrated example of an inertia track 548 is substantially semi-circular, one or more other cross-sectional profiles (e.g., elliptical, etc.) may be used. In some examples, the inertia track 548 is annular or spiraled, depending on length, and the openings 544, 549 may be formed at varying circumferential positions from one another (e.g., 120°, 240°, 360°, 540°, etc.) to vary a path length of the operating fluid 504 through the inertia track 548. The variation of the path length and/or cross-sectional area of the inertia track 548 permits tailoring of response characteristics of the orifice plate 540 to vehicle-specific design parameters for the example hydraulic mount 500.

The compression fit connection between the first connector 520 and the second connector 522 further secures outer circumferential portions of an example diaphragm 560 as a second compliance member. The diaphragm 560, formed from a resilient material such as rubber, extends along an inner surface 576 of the outer housing 525 to a position beneath the orifice plate 540.

In the above described arrangement, shown in FIG. 5, a first chamber 570 is defined between the orifice plate 540 and the first housing portion 501 and a second chamber 572 is defined between the orifice plate 540 and the diaphragm 560. The hydraulic mount 500 of FIG. 5 thus uses a single orifice plate and a diaphragm to define a two chambers in an interior volume of the hydraulic mount 500.

As with FIG. 4, it can be observed in FIG. 5 that a position of the first decoupler 546 in the first cage 545 is different than a position of a second decoupler 556 in the second cage 555. The first decoupler 546 is shown to be adjacent the second plate 542 of the orifice plate 540 in a position occluding the orifice(s) 547, whereas the second decoupler 556 is shown to be adjacent the first plate 541 in a position occluding the orifice(s) 553. This difference is attributable to the design of the first decoupler 546 and the second decoupler 556. The first decoupler 546 has a density greater than a density of the operating fluid 504 (e.g., a mixture of distilled water and ethylene glycol, etc.) and, accordingly, tends to sink within the first cage 545 toward a default position at a bottom of the first cage 545, adjacent the second plate 542, to occlude the orifice(s) 547. The second decoupler 556 has a density less than a density of the operating fluid 504 to bias the second decoupler 556 toward a second default position adjacent the first plate 541 of the first orifice plate 540 in a position occluding orifice(s) 553.

As a result of the compression or extension of the hydraulic mount 500, fluid flow of the operating fluid 504 flows between the first chamber 570 and the second chamber 572 in a direction corresponding on a direction of the force applied to the hydraulic mount 500. In operation, elastic deformation of the example annular rubber main spring 510 and the example first mount 515 under an applied compressive or tensile force acts as a piston upon the operating fluid 504 in the first chamber 570. Under a tensile force, for example, a negative pressure is developed in the first chamber 570 by movement of the annular rubber main spring 510 and the first mount 515 (e.g., a piston), causing fluid to flow from the second chamber 572 into the first chamber 570 through the orifices 543, 547 or inertia track 548 (via openings 544, 549).

To illustrate an example application of a tensile force to the hydraulic mount 500, a negative pressure in the first chamber 570 arising from application of the tensile force draws the first decoupler 546, which is in an initial position in the first cage 545 adjacent the second plate 542, away from the second plate 542 to create a temporary low resistance flow path from the second chamber 572 to the first chamber 570 through the orifices 543, 547. The second decoupler 556, in an initial position in the second cage 555 adjacent the first plate 541, immediately occludes the orifice (s) 553 and blocks flow through the orifices 553, 557. At this point, flow through the higher resistance inertia track 548 from the second chamber 572 to the first chamber 570 is negligible. If the flow path through the orifices 543, 547 is not sufficient to equalize the pressure and the first decoupler 546 is drawn against the first plate 541 to occlude the orifices 543, so that both orifices 543, 553 are occluded, a resistance of the inertia track 548 is overcome and a flow path is established from the second chamber 572 to the first chamber 570 through the inertia track 548.

Conversely, to illustrate an example application of a compressive force to the hydraulic mount 500, a positive pressure in the first chamber 570 arising from application of the compressive force urges the first decoupler 546, already in an initial position in the first cage 545 adjacent the second plate 542, against the second plate 542 to immediately prevent flow through the orifices 543, 547. The positive pressure in the first chamber 570 urges the second decoupler 556, in an initial position in the first cage 545 adjacent the first plate 541, to move away from the first plate 541 to enable flow of the operating fluid 504 through the relatively low friction flow path through the orifices 553, 557. If a pressure differential between the first chamber 570 and the second chamber 572 reaches a threshold level in compression or extension, both decouplers 546, 556 decouple the respective flow paths through the first cage 545 and second cage 545 and flow of the operating fluid 504 proceeds through the high-resistance inertia track 548 with diaphragm 560 expanding and contracting responsive thereto. So configured, regardless of whether an initial shock absorber motion is in compression or extension, one of the two decouplers 546, 556 is always positioned to guarantee an initial open flow or low-resistance flow path, thereby improving secondary ride by dampening higher frequency low amplitude vibrations.

FIG. 6 illustrates another example hydraulic mount 600 that may be integrated with a shock absorber, such as the example shock absorber 320 of FIG. 3. The hydraulic mount 600 includes a first housing portion 601 (e.g., an upper portion in the example of FIG. 6) and a second housing portion 602 (e.g., a lower portion in the example of FIG. 6, etc.) connected to form a hydraulic seal 603 to retain an operating fluid 604 within the hydraulic mount 600.

The example first housing portion 601 shown in FIG. 6 includes an example outer housing 605 formed from a metal or metal alloy such as, for example, a steel alloy or aluminum, or from a composite material. An example annular rubber main spring 610 is disposed within, and connected or bonded to, the outer housing 605 as a compliance portion. An example first mount 615 is disposed within the annular rubber main spring 610. The first mount 615 includes an example connector 616 (e.g., a threaded stud, mechanical fastener, etc.) to facilitate connection of the hydraulic mount 600 to another component, such as a supporting bracket. In one example, the hydraulic mount 600 is integrated with a shock absorber, such as the example shock absorber 320 of FIG. 3, and the first connector 616 connects to a base portion of a shock absorber mount 330.

The first housing portion 601 includes, at an end opposite to that of the first mount 615, an example first connector 620 to facilitate connection of the first housing portion 601 to a corresponding mating second connector 622 of the second housing portion 602 to form the hydraulic seal 603. In the example shown in FIG. 6, the first connector 620 is an inwardly-directed annular channel into which the example second connector 622, an outwardly-directed flange, is received and retained, under compression, to form the hydraulic seal 603. Similar to the example hydraulic mount 400 described above, the first connector 620 and the second connector 622 may be variously configured to utilize different forms of mechanical connection to form the hydraulic seal 603.

The example second housing portion 602 shown in FIG. 6 includes an example outer housing 625 formed from a metal or metal alloy such as, for example, a steel alloy or aluminum, or from a composite material. The outer housings 605, 625 may be formed from the same material(s) or from different material(s). An end portion of the outer housing 625 opposite the end bearing the second connector 622 includes an example second connector 626 (e.g., a threaded stud, mechanical fastener, etc.) to facilitate connection of the hydraulic mount 600 to another component, such as a supporting bracket. In one example, the hydraulic mount 600 is integrated with a shock absorber, such as the example shock absorber 320 of FIG. 3, and the example second connector 626 is operably coupled to a piston rod (not shown) of a shock absorber.

The compression fit connection between the first connector 620 and the second connector 622 secures outer circumferential portions of an example first orifice plate 640 including an example first plate 641 and an example second plate 642. In some examples, the first orifice plate 640 is a unitary structure rather than a separate first plate 641 and second plate 642. The first plate 641 of the orifice plate 640 defines one or more orifices 643 in a central portion of the first plate 641 to permit passage of the operating fluid 604 therethrough. The first plate 641 further defines an opening 644, in an outer circumferential portion, to permit passage of the operating fluid 604 therethrough.

FIG. 6 shows the second plate 642 of the first orifice plate 640 to define, in a central portion thereof, a first cage 645 in which a first decoupler 646 is housed and movably disposed to move between the first plate 641 and the second plate 642. The first cage 645 defines one or more orifices 647 to permit passage of the operating fluid 604 therethrough. In the example of FIG. 6, a plurality of orifices 647 are provided in a central portion of the first cage 645. The second plate 642 of the first orifice plate 640 also defines an inertia track 648, a channel (e.g., an annular channel, etc.) extending from a first portion of the second plate 642 to a second portion of the second plate 642 (e.g., along an outer circumferential portion of the second plate 642, etc.) to provide a damping or resistance to fluid flow. An opening 649 is formed in a portion of the second plate 642, in the inertia track 648, to permit passage of the operating fluid 604 therethrough. In the example of FIG. 6, the opening 649 in the second plate 642 is formed opposite to (e.g., circumferentially spaced 180° relative to) the opening 644 in the first plate 641, causing the operating fluid 604 to move through the depicted annular inertia track 648 from one side of the first orifice plate 640 to the opposite side. The inertia track 648 may include one or more straight or curvilinear sections and may include one or more flow restrictors (e.g., a reduced cross-sectional area, bumps in the flow path, etc.). Although a cross-sectional profile in the illustrated example of an inertia track 648 is substantially semi-circular, one or more other cross-sectional profiles (e.g., elliptical, etc.) may be used. In some examples, the inertia track 648 is annular or spiral, depending on length, and the openings 644, 649 may be formed at varying circumferential positions from one another (e.g., 120°, 240°, 360°, 540°, etc.) to vary a path length of the operating fluid 604 through the inertia track 648. The variation of the path length and/or cross-sectional area of the inertia track 648 permits tailoring of response characteristics of the first orifice plate 640 to vehicle-specific design parameters for the example hydraulic mount 600.

The compression fit connection between the first connector 640 and the second connector 642 also secures outer circumferential portions of an example second orifice plate 650 including an example first plate 651 and an example second plate 652. In some examples, the second orifice plate 650 is a unitary structure rather than a separate first plate 651 and second plate 652. The first plate 651 of the second orifice plate 650 defines one or more orifices 653 to permit passage of the operating fluid 604 therethrough. In the example of FIG. 6, a plurality of orifices 653 are provided in a central portion of the second orifice plate 650. The first plate 651 further defines an opening 654, in an outer circumferential portion, to permit passage of the operating fluid 604 therethrough.

FIG. 6 shows the second plate 652 of the second orifice plate 650 to define, in a central portion thereof, a second cage 655 (e.g., a substantially cylindrical structure, etc.) in which a second decoupler 656 is housed and movably disposed to move between the first plate 651 and the second plate 652. The second cage 655 defines one or more orifices 657 to permit passage of the operating fluid 604 therethrough. In the example of FIG. 6, a plurality of orifices 657 are provided in a central portion of the second cage 655. The second plate 652 of the second orifice plate 650 also defines an inertia track 658, a channel extending from a first portion of the second plate 652 to a second portion of the second plate 652 to provide a damping or resistance to fluid flow. An opening 659 is formed in a portion of the second plate 652, in the inertia track 658, to permit passage of the operating fluid 604 therethrough. In the example of FIG. 6, the opening 659 in the second plate 652 is formed opposite to (e.g., 180°) the opening 654 in the first plate 651, thereby causing the operating fluid 604 to move through the depicted annular inertia track 658 from one side of the first orifice plate 650 to the opposite side. The inertia track 658 may include one or more straight or curvilinear sections. In some examples, the inertia track 658 is annular or spiral, depending on length, and the openings 644, 649 may be formed at varying circumferential positions from one another (e.g., 120°, 240°, 360°, 540°, etc.) to vary a path length of the operating fluid 604 through the inertia track 658. The variation of the path length and/or cross-sectional area of the inertia track 658 permits tailoring of response characteristics of the first orifice plate 650 to vehicle-specific design parameters for the example hydraulic mount 600.

The compression fit connection between the first connector 640 and the second connector 642 further secures outer circumferential portions of an example first diaphragm 660 and an example second diaphragm 661 as a second and a third compliance member, respectively. The first and second diaphragms 660, 661, may be formed from the same material, or different materials. In one example, the first and second diaphragms 660, 661 are formed from a resilient material, such as a rubber, with the first diaphragm 660 extending along an inner surface of the second housing portion 625 to a position beneath the first orifice plate 640 and the second diaphragm 661 extending along an inner surface of the second housing portion 625 to a position beneath the second orifice plate 650.

In the above described arrangement, shown in FIG. 6, a first chamber 670 is defined between the first orifice plate 640 and the first housing portion 601, a second chamber 672 is defined between the first orifice plate 640 and the first diaphragm 660, a third chamber 674 is defined between the first diaphragm 660 and the second orifice plate 640 and a fourth chamber 676 is defined between the second orifice plate 650 and the second diaphragm 661. The hydraulic mount 600 thus uses a plurality of orifice plates 640, 650 and a plurality of diaphragms 660, 661 to define a plurality of chambers in an interior volume of the hydraulic mount 600.

It can be observed in FIG. 6 that a position of the first decoupler 646 in the first cage 645 is different than a position of the second decoupler 656 in the second cage 655. In FIG. 6, the first decoupler 646 is shown to be adjacent the second plate 642 of the first orifice plate 640 in a position occluding the orifice(s) 647, whereas the second decoupler 656 is shown to be adjacent the first plate 651 of the second orifice plate 650 in a position occluding the orifice(s) 653. This difference is attributable to the design of the first decoupler 646 and the second decoupler 656. The first decoupler 646 has a density greater than a density of the first operating fluid 604 (e.g., a mixture of distilled water and ethylene glycol, etc.) to bias the first decoupler 646 (e.g., a disc of an elastomeric material, etc.) toward a first default position adjacent the second plate 642 of the first orifice plate 640 in a position occluding the orifice(s) 647. In this example, the density of the first decoupler 646, being greater than that of the first operating fluid 604, causes the first decoupler 646 to sink toward a default position at a bottom of the first cage 645.

The second decoupler 656 has a density less than a density of a second operating fluid 664 (e.g., a mixture of distilled water and ethylene glycol different than that of the first operating fluid 604, etc.) to bias the second decoupler 656 toward a second default position different than that of the default position of the first decoupler 646. In the example of FIG. 6, the second default position of the second decoupler 656 is adjacent the first plate 651 of the second orifice plate 650 in a position occluding the orifice(s) 653. The density of the second decoupler 656 in this example is less than that of the second operating fluid 664. As a result, the second decoupler 656 floats within the second cage 655 toward a default position at a top of the second cage 655.

As a result of the compression or extension of the hydraulic mount 600, the operating fluid 604 flows between the first chamber 670 and the second chamber 672 and between the third chamber 674 and the fourth chamber 676 in a direction corresponding to a direction of the applied force. In operation, elastic deformation of the example annular rubber main spring 610 and the example first mount 615 under an applied compressive or tensile force acts as a piston upon the operating fluid 604 in the first chamber 670. Under a tensile force, for example, a negative pressure is developed in the first chamber 670 by movement of the annular rubber main spring 610 and the first mount 615 (e.g., a piston), causing fluid to flow from the second chamber 672 into the first chamber 670 through the inertia track 648 (via openings 644, 649) and/or orifices 643, 647 depending on the degree of pressure differential. Additionally, flow from the second chamber 672 into the first chamber 670 causes a corresponding contraction of the first diaphragm 660, altering a boundary of the third chamber 674 and a pressure therein and driving flow from the fourth chamber 676 into the third chamber 674 through the inertia track 658 (via openings 654, 659) and/or orifices 653, 657.

To illustrate an example application of a tensile force to the hydraulic mount 600, a negative pressure in the first chamber 670 arising from application of the tensile force draws the first decoupler 646, which is in an initial position in the first cage 645 adjacent the second plate 642, away from the second plate 642 to temporarily create a low resistance flow path from the second chamber 672 to the first chamber 670 through the orifices 643, 647. At this point, flow through the higher resistance inertia track 648 from the second chamber 672 to the first chamber 670 is negligible. If the flow path through the orifices 643, 647 is not sufficient to equalize the pressure and the first decoupler 646 is drawn against the first plate 641 to occlude the orifices 643, a resistance of the inertia track 648 is overcome and a flow path is established from the second chamber 672 to the first chamber 670 through the inertia track 648. As noted above, flow from the second chamber 672 into the first chamber 670 causes a corresponding contraction of the first diaphragm 660, altering a boundary of the third chamber 674 and a pressure therein. This drives flow from the fourth chamber 676 into the third chamber 674 through the inertia track 658 (via openings 654, 659) and/or orifices 653, 657. In the configuration of FIG. 6, flow of the second operating fluid 664 from the fourth chamber 676 to the third chamber 674 is only through the inertia track 658, as the second decoupler 656 is, in its default position, biased against the first plate 651 to occlude and block flow through the orifices 653.

Conversely, to illustrate an example application of a compressive force to the hydraulic mount 600, a positive pressure in the first chamber 670 arising from application of the compressive force biases the first decoupler 646, which is already in an initial position in the first cage 645 adjacent the second plate 642, against the second plate 642 to immediately prevent flow through the orifices 643, 647. The only available flow path from the first chamber 670 to the second chamber 672 is through the high-resistance inertia track 648. As pressure builds in the second chamber 672 due to the flow of the first operating fluid 604 into the second chamber 672 through the inertia track 648, the increased pressure in the second chamber 672 biases the first diaphragm 660 to compress the second operating fluid 664 in the third chamber 674, thereby increasing the pressure in the third chamber 674. The positive pressure differential between the third chamber 674 and the fourth chamber 676 forces fluid from the third chamber 674 into the fourth chamber 676 via the low resistance flow path through the orifices 653, 657 following displacement of the second decoupler 656. If the pressure in the third chamber 674 is sufficient to bias the second decoupler 656 against the orifices 657 of the second cage 655, further flow from the third chamber 674 to the fourth chamber 676 occurs through the inertia track 658.

The example hydraulic mount 600 presents not only a plurality of orifice plates (e.g., 640, 650), decouplers (e.g., 646, 656) and inertia tracks (e.g., 648, 658), to offer additional degrees of freedom in isolation design optimization, but also provides for use of more than one operating fluid (e.g., 604, 664) having different characteristics (e.g., density, etc.) to permit still further tailoring of the hydraulic mount 600 to exhibit preferred dynamic characteristics in one or more directions of motion. As with the embodiments of FIGS. 4-5, one decoupler (e.g., the first decoupler 646) has a higher density than the operating fluid 604 and the other decoupler (e.g., the second decoupler 656) has lower density than the operating fluid 604, so that a shock absorber and hydraulic mount combination (e.g., 300; FIG. 3) will always guarantee an initial open flow, or an initial low-resistance flow path, regardless of the whether an initial shock absorber motion is in compression or extension.

Figure 7:
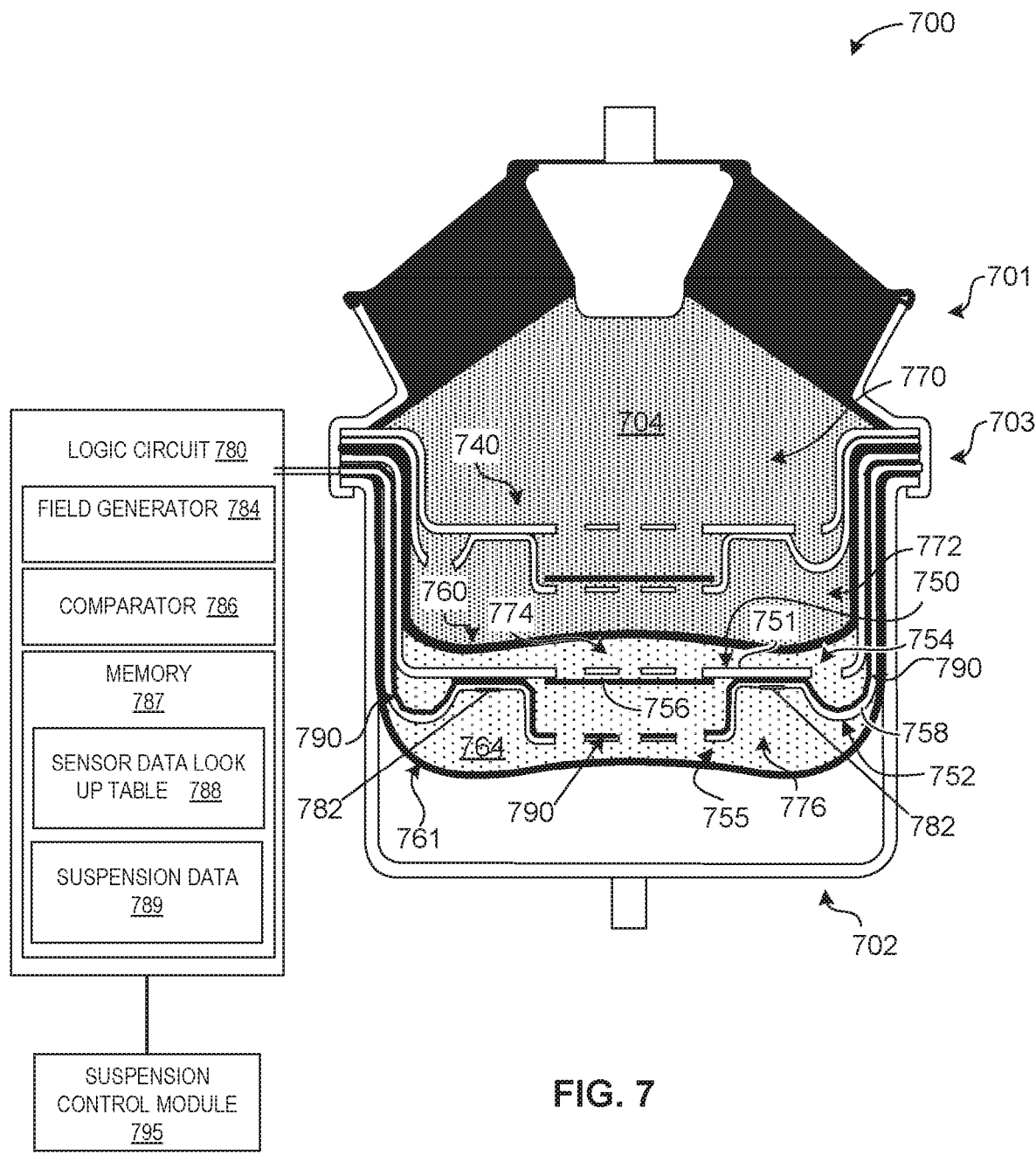
FIG. 7 is yet another example hydraulic mount that may be used in the example shock absorbing apparatus of FIG. 3 in accordance with teachings of this disclosure.

FIG. 7 illustrates another example hydraulic mount 700 structurally similar to the hydraulic mount 600 of FIG. 6. FIG. 7 depicts, for example, a first housing portion 701 and a second housing portion 702 connected to secure a first orifice plate 740, a first diaphragm 760, a second orifice plate 750 and a second diaphragm 761 and to form hydraulic seal 703. In the example shown in FIG. 7, the second orifice plate 750 includes a first plate 751 and a second plate 752 with the second plate 752 defining a cage 755 in which a decoupler 756 is housed. FIG. 7 also shows, similar to FIG. 6, the first orifice plate 740 and the second orifice plate 750 divide the example hydraulic mount 700 into a first chamber 770, second chamber 772, third chamber 774 and fourth chamber 776. A first operating fluid 704 is contained within the first chamber 770 and the second chamber 772. A second operating fluid 764 is contained within the third chamber 774 and the fourth chamber 776.

However, unlike the example of FIG. 6, in FIG. 7 the second operating fluid 764 is an electronically controllable fluid. In other examples, the first operating fluid 704 could include an electronically controllable fluid and/or both the first operating fluid 704 and the second operating fluid 764 may be electronically controllable fluids. In some examples, the electronically controllable fluid may include an electrorheological fluid or a magnetorheological fluid. The electrorheological fluid includes a suspension of non-conducting but electrically active particles in an electrically insulating fluid so that, upon application of an electric field, the apparent viscosity of the electrorheological fluid reversibly changes in proportion to an intensity of the applied electric field. The electrorheological fluid can be caused to transition from a first viscosity to a second viscosity, selected from a plurality of desired viscosities, in milliseconds, by a hydraulic mount logic circuit 780 configured to selectively control a viscosity of the electrorheological fluid. Similarly, magnetorheological fluid includes a suspension of extremely fine (e.g., microparticles, nanoparticles) magnetic particles in a carrier fluid (e.g., oil) that, upon application of a magnetic field, reversibly align themselves along the field lines to increase the apparent viscosity of the magnetorheological fluid in proportion to an intensity of the applied electric field. The magnetorheological fluid can, accordingly, be caused to transition from a first viscosity to a second viscosity, selected from a plurality of desired viscosities, in milliseconds, by the hydraulic mount logic circuit 780 configured to selectively control a viscosity of the magnetorheological fluid.

FIG. 7 depicts a block diagram of an example logic circuit used to implement the example hydraulic module 700. In the illustrated example of FIG. 7, the logic circuit 780 includes an example field generator 784, an example comparator 786, and an example memory 787. However, other example implementations of the logic circuit 780 may include fewer or additional structures.

In some examples, the example field generator 784 is an electric field generator to generate an electric field to cause a change in a characteristic (e.g., viscosity) of an electrorheological fluid via supporting structure, such as electrical conductors 790 and plates or electrodes disposed in or adjacent an inertia track 758 of the second orifice plate 750 or an opening thereto, such as opening 754, across which a potential difference can be developed to alter a resistance or dampening provided by the inertia track 758. In some examples, the example field generator 784 is a magnetic field generator to generate a magnetic field to cause a change in a characteristic (e.g., viscosity) of a magnetorheological fluid via supporting structure, such as electrical conductors 790 (e.g., coiled conductors). In some examples, the logic circuit 780 is a closed-loop control system to cause the characteristics of an electronically controllable fluid to correspond to a desired state of the hydraulic mount 700 at a particular moment during operation, such as during operation of a semi-active shock absorber utilizing the hydraulic mount 700. The logic circuit 780 is communicatively coupled to one or more sensors 782 (e.g., a pressure sensor, a piezoelectric sensor, a frequency sensor, etc.) internal to the hydraulic mount 700 and/or external to the hydraulic mount 700 (e.g., a piezoelectric sensor integrated with, or external to, a diaphragm 760, etc.) to provide feedback to the logic circuit 780 corresponding to one or more variables directly or indirectly correlated to one or more conditions in the hydraulic mount 700. An example comparator 786 compares data from the one or more sensors 782 to a corresponding look up table 788 for the sensor data in the example memory 787 to determine whether an adjustment to the field generator 784 output is warranted.

The example comparator 786 of FIG. 7 may be implemented by a semiconductor device such as a processor, microprocessor, controller or microcontroller. The comparator 786 manages and/or controls the operation of the example logic circuit 780 of FIG. 7 based on data, information and/or one or more signal(s) obtained and/or accessed by the comparator 786 from one or more of the sensors 782 or sensors external to the hydraulic mount 700.

The example memory 787 of FIG. 7 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 787 may be stored in any file and/or data structure format, organization scheme, and/or arrangement. In some examples, the memory 787 stores use information and/or data (e.g., the sensor data look up table 788 of FIG. 7). The memory 787 is accessible to the example logic circuit 780, as well as an example vehicle suspension control module (SCM) 795.

While an example manner of implementing the example logic circuit 780 is illustrated in FIG. 7, one or more of the elements, processes and/or devices illustrated in FIG. 7 may be combined, divided, re-arranged, omitted, eliminated and/or implemented in any other way. Further, the example logic circuit 780, the example field generator 784, the example comparator 786 and the example memory 787 of FIG. 7 may be implemented by a semiconductor device such as a processor. The example logic circuit 780, the example field generator 784, the example comparator 786 and the example memory 787 of FIG. 7 may also be implemented by hardware, software, firmware and/or any combination of hardware, software and/or firmware. Thus, for example, any of the example logic circuit 780, the example field generator 784, the example comparator 786 and the example memory 787 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example logic circuit 780, the example field generator 784, the example comparator 786 and the example memory 787 of FIG. 7 is/are hereby expressly defined to include a tangible computer readable storage device or storage disk such as a memory, a digital versatile disk (DVD), a compact disk (CD), a Blu-ray disk, etc. storing the software and/or firmware. Further still, the example logic circuit 780 of FIG. 7 may include one or more elements, processes and/or devices in addition to, or instead of, those illustrated in FIG. 7, and/or may include more than one of any or all of the illustrated elements, processes and devices.

Figure 8:
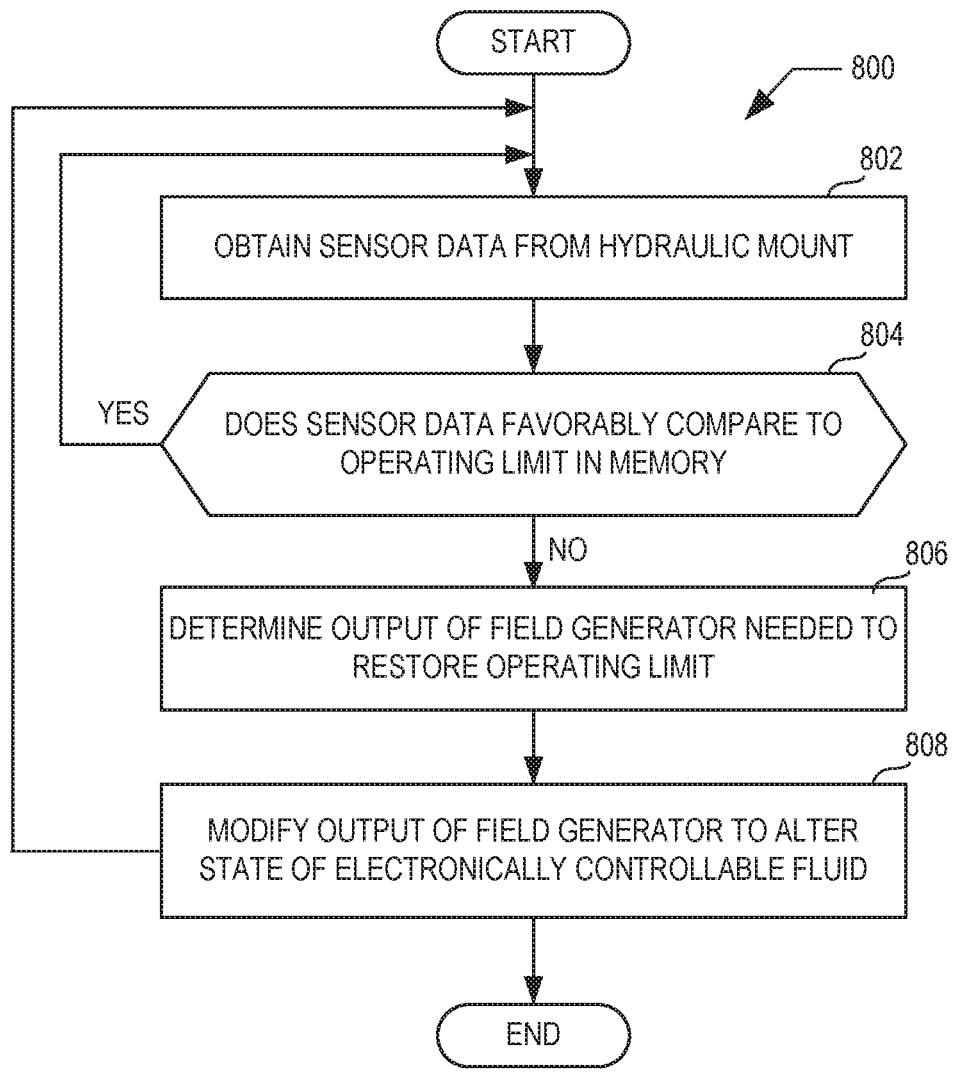
FIG. 8 is a flowchart of an example method in accordance with teachings of this disclosure.

A flowchart representative of an example method 800 for implementing the example logic circuit 780 of FIG. 7 to dynamically alter an operation of the hydraulic mount 700 is shown in FIG. 8. In the example of FIG. 8, the method 800 may be implemented using machine-readable instructions that comprise one or more program(s) for execution by a processor such as the example processor 902 of the example processor platform 900 discussed below in connection with FIG. 9. The one or more program(s) may be embodied in software stored on a tangible computer readable storage medium such as a CD-ROM, a floppy disk, a hard drive, a digital versatile disk (DVD), a Blu-ray disk, or a memory associated with the processor 902, but the entire program(s) and/or parts thereof could alternatively be executed by a device other than the processor 902 and/or embodied in firmware or dedicated hardware. Further, although the example program(s) is/are described with reference to the flowchart illustrated in FIG. 8, many other methods for implementing the example logic circuit 780 to dynamically alter an operation of the hydraulic mount 700 may alternatively be used. For example, the order of execution of the blocks may be changed, and/or some of the blocks described may be changed, eliminated, or combined.

As mentioned above, the example method 800 of FIG. 8 to dynamically alter an operation of the hydraulic mount 700 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method 800 of FIG. 8 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 800 begins at block 802 when the example logic circuit 780 receives sensor data from example sensors 782 of the example hydraulic mount 700. At block 804, the measured sensor data is compared, via the comparator 786, to sensor data values in the memory 787 sensor data look up table 788 of FIG. 7 to determine if the measured sensor data favorably compares to acceptable operating limits for the sensor data. Block 804 may further include comparing data received from the suspension control module 795 to suspension data 789 in the memory 787 of FIG. 7 via the example comparator 786. If, in block 804, if the measured sensor data is within acceptable operating limits for the sensor data, control passes to block 802 for continued monitoring of sensor data from the sensors 782. If, in block 804, the measured sensor data does not favorably compare to acceptable operating limits for the sensor data, control passes to block 806.

In block 806, the example logic circuit 780 of FIG. 7 determines an output of the example field generator 784 needed to restore the example hydraulic mount 700 to a state within the operating limit set within the memory 787 (e.g., within the example sensor data look up table 788 or within the suspension data 789) or set by the suspension control module 795. Thus, for example, the example logic circuit 780 may determine that a viscosity of the electronically controllable fluid 764 should be reduced to reduce a dampening effect or increased to increase a dampening effect to return the example hydraulic mount 700 to a state within the relevant operating limit. In Block 808, the logic circuit 780 then instructs the field generator 784 to generate a field in Block 806 to return the example hydraulic mount 700 to a state within the relevant operating limit.

Figure 9:
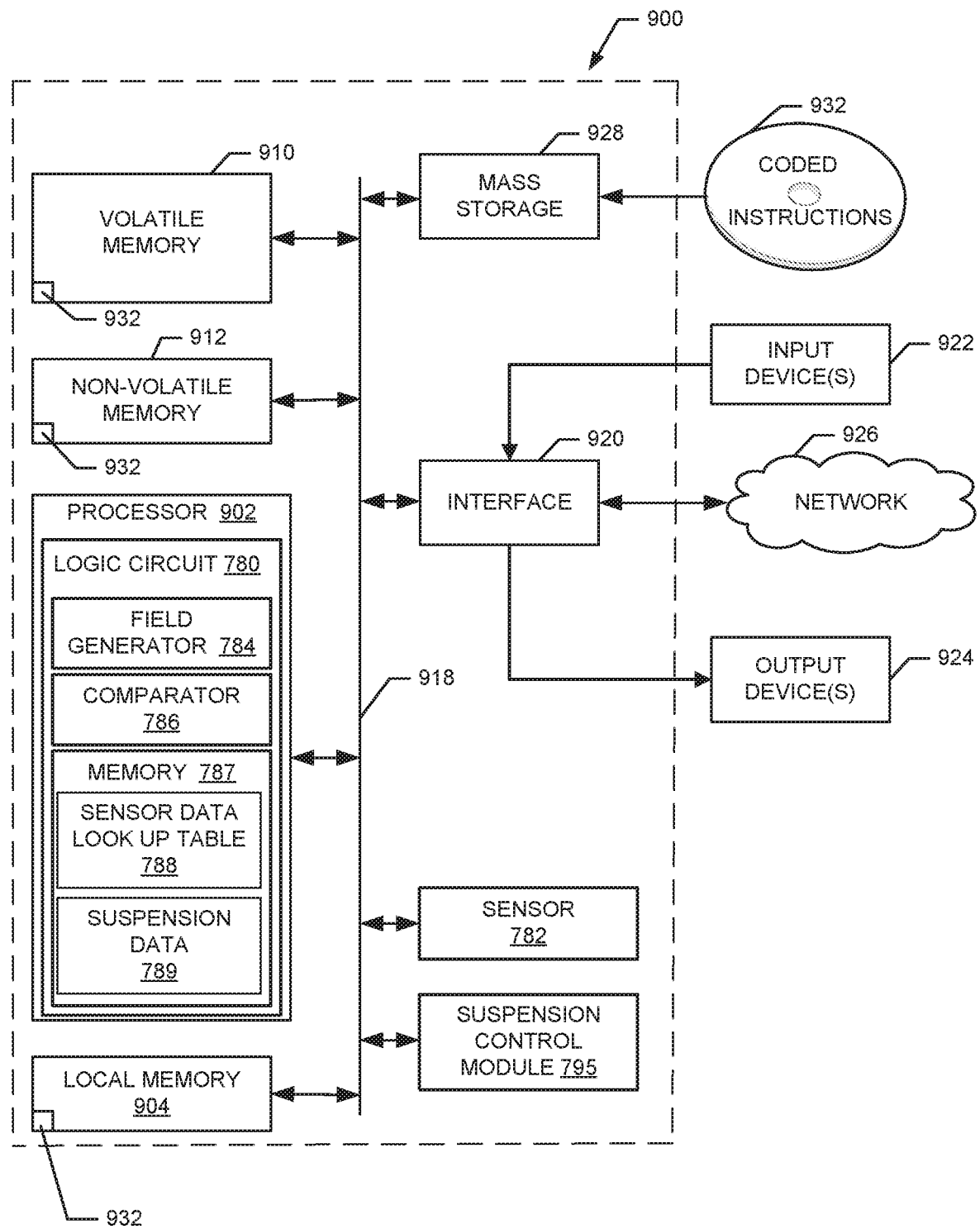
FIG. 9 is a block diagram of an example processor platform that may execute instructions to implement the method of FIG. 8.

FIG. 9 is an example processor platform 900 capable of executing instructions to implement the method 800 of FIG. 8 and the example logic circuit 780 of FIG. 7. The processor platform 900 of the illustrated example includes a processor 902. The processor 902 of the illustrated example is hardware. For example, the processor 902 can be implemented by one or more integrated circuit(s), logic circuit(s), processor(s), microprocessor(s), controller(s) or microcontroller(s) from any desired family or manufacturer. The processor 902 of the illustrated example includes a local memory 904 (e.g., a cache). In the illustrated example, the processor 902 includes the example logic circuit 780, the example field generator 784, the example comparator 786, the example memory 787, the example sensor data look up table 788 and the example suspension data 789 of FIG. 7.

The processor 902 of the illustrated example is in communication with one or more example sensors 792 and the suspension control module 795 of FIG. 7 via a bus 918. The processor 902 of the illustrated example is also in communication with a main memory including a volatile memory 910 and a non-volatile memory 912 via the bus 918. The volatile memory 910 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 912 may be implemented by flash memory and/or any other desired type of memory device. Access to the volatile memory 910 and the non-volatile memory 912 is controlled by a memory controller.

The processor 902 of the illustrated example is also in communication with one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The processor platform 900 of the illustrated example also includes an interface circuit 920. The interface circuit 920 may be implemented by any type of interface standard, such as an Ethernet interface, a universal serial bus (USB), and/or a PCI express interface. In the illustrated example, one or more input device(s) 922 are connected to the interface circuit 920. The input device(s) 922 permit(s) a user to enter data and commands into the processor 902. The input device(s) 922 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 924 are also connected to the interface circuit 920 of the illustrated example. The output device(s) 924 can be implemented, for example, by a light emitting diode, an organic light emitting diode, a liquid crystal display, a touchscreen and/or a speaker. The interface circuit 920 of the illustrated example may, thus, include a graphics driver such as a graphics driver chip and/or processor. The interface circuit 920 may be implemented by any type of interface standard, such as an Ethernet interface, a universal serial bus (USB), and/or a PCI express interface to enable communication via the input device(s) 922, output device(s), bus 918 and connected circuits and components, and network 926 (e.g., a vehicle network, a cellular network, a wireless local area network (WLAN), etc.).

Coded instructions 932 for implementing the method of FIG. 8 may be stored in the local memory 904, in the volatile memory 910, in the non-volatile memory 912, in the mass storage device 928, and/or on a removable tangible computer readable storage medium such as a CD or DVD.

In still additional examples, rather than providing a plurality of decouplers in the manner disclosed having different densities than an operating fluid or fluids, one or more biasing elements (e.g., a spring, a plurality of springs, etc.) can be mounted in the cages (e.g., 445, 455 of FIG. 4) to bias the decouplers in a desired direction. In some examples, to account for a compression height of the spring(s), the decouplers may advantageously be provided with protuberances dimensioned to contact and occlude the orifices in the cage to provide a desired flow isolation function at a desired dynamic state. Accordingly, while use of decouplers having different densities is one manner in which the decouplers may be positioned in different positions to ensure an initial open flow and low-resistance flow path for the disclosed combination of a shock absorber and a hydraulic mount, regardless of the whether an initial shock absorber motion is in compression or extension, other conventional manners of positioning the decouplers are considered to fall within the present disclosure.

In another example, rather than providing a diaphragm (e.g., 460) as a lower pressure boundary, a piston may be used to provide a flexible fluid boundary for the third chamber 474 (FIG. 4), second chamber 572 (FIG. 5), fourth chamber 676 (FIG. 6) or third chamber 776 (FIG. 7).

From the foregoing, it will be appreciated that the disclosed apparatus, and the disclosed method for controlling a hydraulic mount including an electrically controllable fluid, provide advantages over known approaches for isolating vibrations in vehicles to improve secondary ride. The disclosed apparatus and method provide new options for isolating vibration, such as road noise, and for improving secondary ride.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicular shock absorbing apparatus, comprising:
   a shock absorber of a suspension system;
   a hydraulic mount operatively coupled with the shock absorber, the hydraulic mount inside the shock absorber;
   a first decoupler movably disposed in a central portion of a first orifice plate of the hydraulic mount, the first decoupler having a density greater than a density of an operating fluid disposed in the hydraulic mount to bias the first decoupler in a first direction toward a first default position, and
   a second decoupler movably disposed in a central portion of a second orifice plate of the hydraulic mount, the central portion of the second orifice plate spaced from the central portion of the first orifice plate.

2. The apparatus of claim 1, wherein the hydraulic mount includes one or more diaphragms, the one or more diaphragms and the first and second orifice plates defining at least two chambers in an interior volume of the hydraulic mount.

3. The apparatus of claim 2, wherein the first orifice plate and the second orifice plate are disposed in series to define in the hydraulic mount, together with a first diaphragm, a first chamber, a second chamber, and a third chamber, the first diaphragm defining a flexible fluid boundary of the third chamber, and wherein the first orifice plate includes a first inertia track and the first decoupler is housed within a first cage and the second orifice plate includes a second inertia track and the second decoupler is housed within a second cage.

4. The apparatus of claim 3, wherein the operating fluid is disposed to flow between the first chamber and the second chamber, through the first orifice plate, and to flow between the second chamber and the third chamber, through the second orifice plate, during compression or extension of the hydraulic mount, wherein the first decoupler moves within the first cage responsive to a pressure differential between the first chamber and the second chamber, and wherein the second decoupler moves within the second cage responsive to a pressure differential between the second chamber and the third chamber.

5. The apparatus of claim 4, wherein the first orifice plate defines in the hydraulic mount, together with a second diaphragm, a first chamber and a second chamber, the second diaphragm defining a flexible fluid boundary of the second chamber, and wherein the second orifice plate, disposed serially below the second chamber, defines in the hydraulic mount, together with the second diaphragm, a third chamber and a fourth chamber, the first diaphragm defining a flexible fluid boundary of the third chamber and the second diaphragm defining a flexible fluid boundary of the fourth chamber.

6. The apparatus of claim 5, wherein the operating fluid is a first operating fluid disposed to flow between the first chamber and the second chamber, through the first orifice plate, during compression or extension of the hydraulic mount, the first decoupler being moved within the first cage responsive to a pressure differential between the first chamber and the second chamber, and further including a second operating fluid disposed to flow between the third chamber and the fourth chamber, through the second orifice plate, during compression or extension of the hydraulic mount, the second decoupler being moved within the second cage responsive to a pressure differential between the third chamber and the fourth chamber.

7. The apparatus of claim 6, wherein at least one of the first operating fluid or the second operating fluid includes an electronically controllable fluid.

8. The apparatus of claim 7, wherein the electronically controllable fluid includes an electrorheological fluid or a magnetorheological fluid.

9. The apparatus of claim 8, wherein the hydraulic mount is exposed to an electric field to control a viscosity of the electrorheological fluid or a magnetic field to control a viscosity of the magnetorheological fluid to alter a response characteristic of the hydraulic mount to compression or extension of the hydraulic mount.

10. The apparatus of claim 6, wherein the first default position is at a first end of the first cage, and wherein the second decoupler has a density less than the density of the operating fluid to bias the second decoupler in a second position toward a default position at a second end of the second cage.

11. The apparatus of claim 4, wherein the first default position is at a first end of the first cage, and wherein the second decoupler has a density less than the density of the operating fluid to bias the second decoupler in a second direction toward a default position at a second end of the second cage.

12. The apparatus of claim 2, wherein the hydraulic mount is tuned to isolate vibrations having a higher frequency and lower amplitude than the vibrations to which the shock absorber is tuned to isolate.

13. The apparatus of claim 12, wherein the hydraulic mount is tuned to isolate frequencies of vibration between about 30 Hz and about 100 Hz.

14. The apparatus of claim 1, wherein the first default position is at a first end of a first cage and wherein the second decoupler has a density less than the density of the operating fluid to bias the second decoupler in a second direction toward a second default position at a second end of a second cage.

15. An apparatus, comprising:
   one or more orifice plates disposed in a hydraulic mount to separate an interior volume of the hydraulic mount into a plurality of chambers, the hydraulic mount inside a shock absorber of a suspension system;
   a first decoupler movably disposed in a first cage of the one or more orifice plates, the first cage including one or more orifices to permit fluid flow between a first chamber and a second chamber, the first decoupler having a density less than a density of an operating fluid disposed in the hydraulic mount to bias the first decoupler toward a default position at a first end of the first cage;
   a second decoupler movably disposed in a second cage of the one or more orifice plates, the second cage including one or more orifices to permit fluid flow between the second chamber and a third chamber; and the operating fluid disposed to flow between the plurality of chambers through the first cage or the second cage during compression or extension of the hydraulic mount.

16. The apparatus of claim 15, wherein the one or more orifice plates includes a first orifice plate and a second orifice plate disposed in series in the hydraulic mount, wherein the first orifice plate includes a first inertia track to fluidly couple the first chamber and the second chamber and the first cage in which the first decoupler is housed, and wherein the second orifice plate includes a second inertia track to fluidly couple the second chamber and the third chamber and the second cage in which the second decoupler is housed.

17. The apparatus of claim 16, wherein, when a pressure imbalance is present between the first and second chambers, the first decoupler obstructs the flow of the operating fluid through the one or more orifices of the first cage to facilitate flow of the operating fluid through the first inertia track.

18. An apparatus, comprising:
one or more orifice plates disposed in a hydraulic mount to separate an interior volume of the hydraulic mount into a plurality of chambers;
a first decoupler movably disposed in the one or more orifice plates;
a second decoupler movably disposed in the one or more orifice plates; and
an operating fluid disposed to flow between the plurality of chambers through the first decoupler or the second decoupler during compression or extension of the hydraulic mount, wherein the first decoupler has a density greater than a density of the operating fluid to urge the first decoupler in a first direction toward a first default position relative to the one or more orifice plates and wherein the second decoupler has a density less than the density of the operating fluid to urge the second decoupler in a second direction toward a second default position relative to the one or more orifice plates.

19. The apparatus of claim 18, wherein the one or more orifice plates include a first orifice plate separating the interior volume of the hydraulic mount into a first chamber and a second chamber, with a first diaphragm defining a flexible fluid boundary of the second chamber, and wherein the first orifice plate includes an inertia track, a first cage in which the first decoupler is housed, and a second cage within which the second decoupler is housed.

20. The apparatus of claim 19, further including an operating fluid disposed to flow between the first chamber and the second chamber, through the first orifice plate, during compression or extension of the hydraulic mount, wherein the first decoupler and the second decoupler move within the first cage and the second cage, respectively, responsive to a pressure differential between the first chamber and the second chamber.

* * * * *